May 29, 1934.  A. H. STOW  1,961,017
MINE OR OTHER CAR
Filed Nov. 15, 1920   4 Sheets-Sheet 2
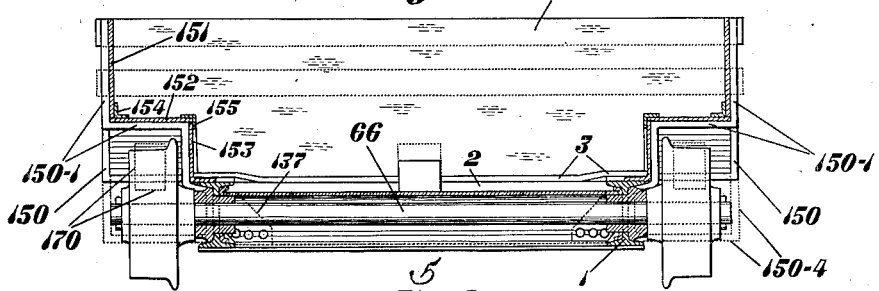
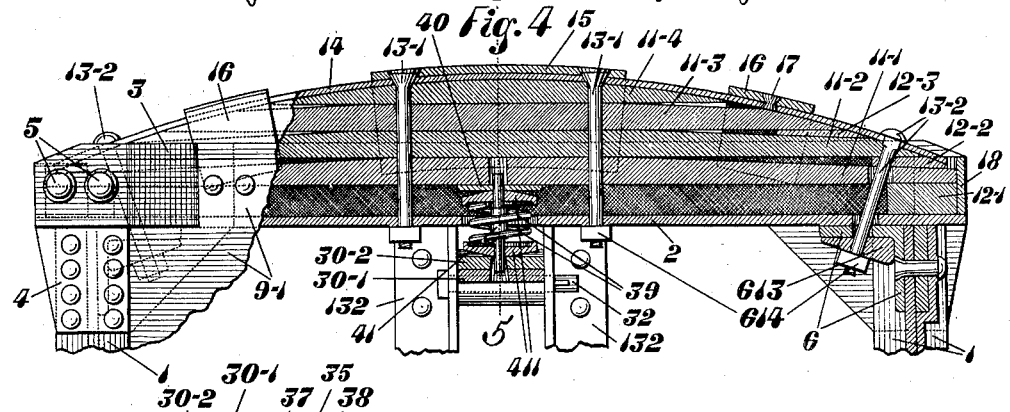
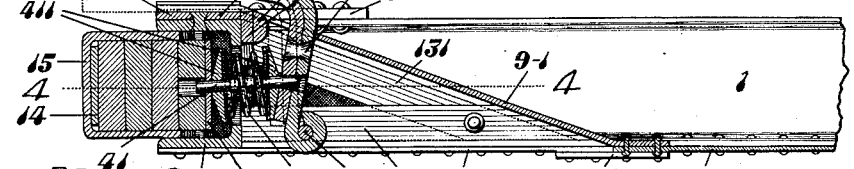
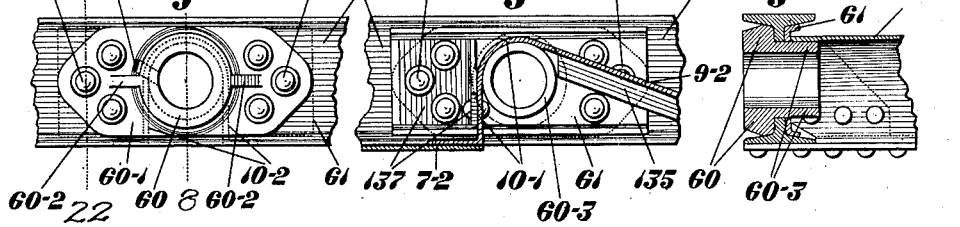
INVENTOR
Audley Hart Stow
BY
Hubert Peck
ATTORNEY May 29, 1934.  A. H. STOW  1,961,017
MINE OR OTHER CAR
Filed Nov. 15, 1920  4 Sheets-Sheet 3
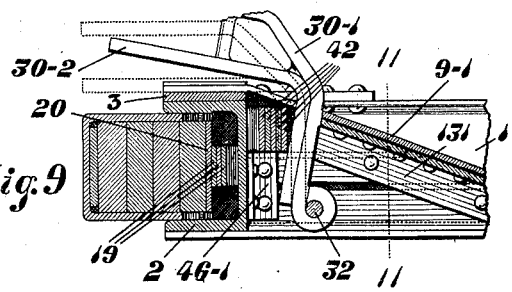
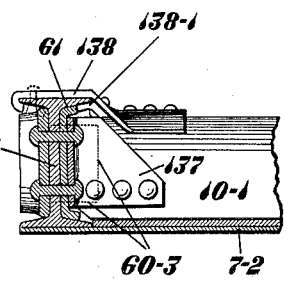
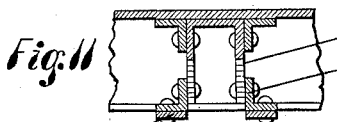
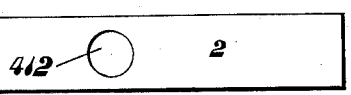
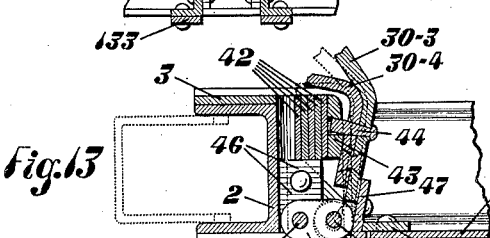
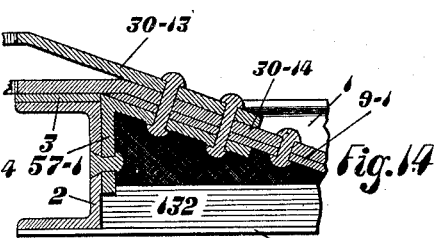
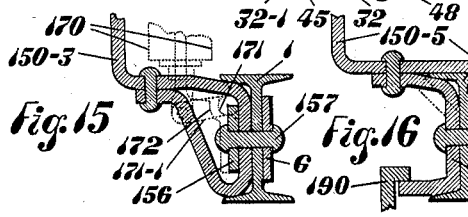
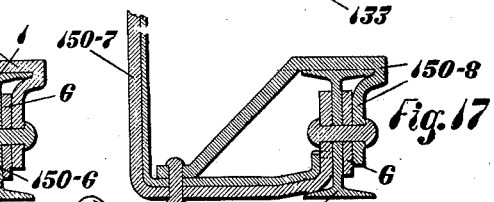
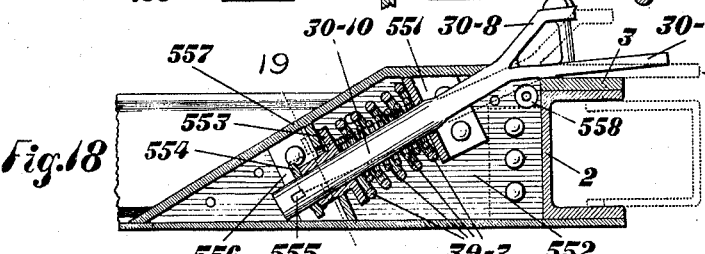
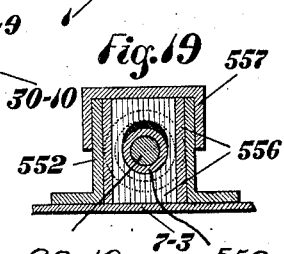
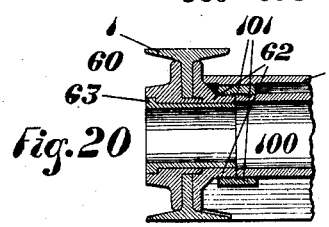
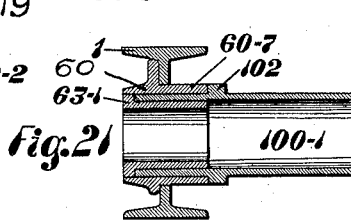
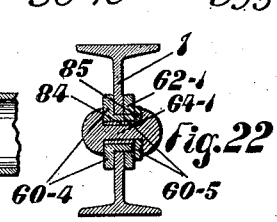
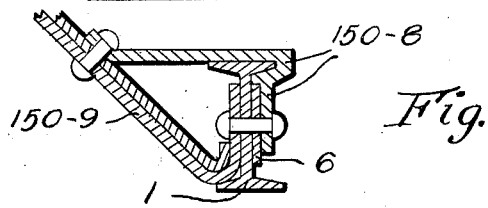
INVENTOR
Audley Hart Stow
BY
Hubert Peck
ATTORNEY

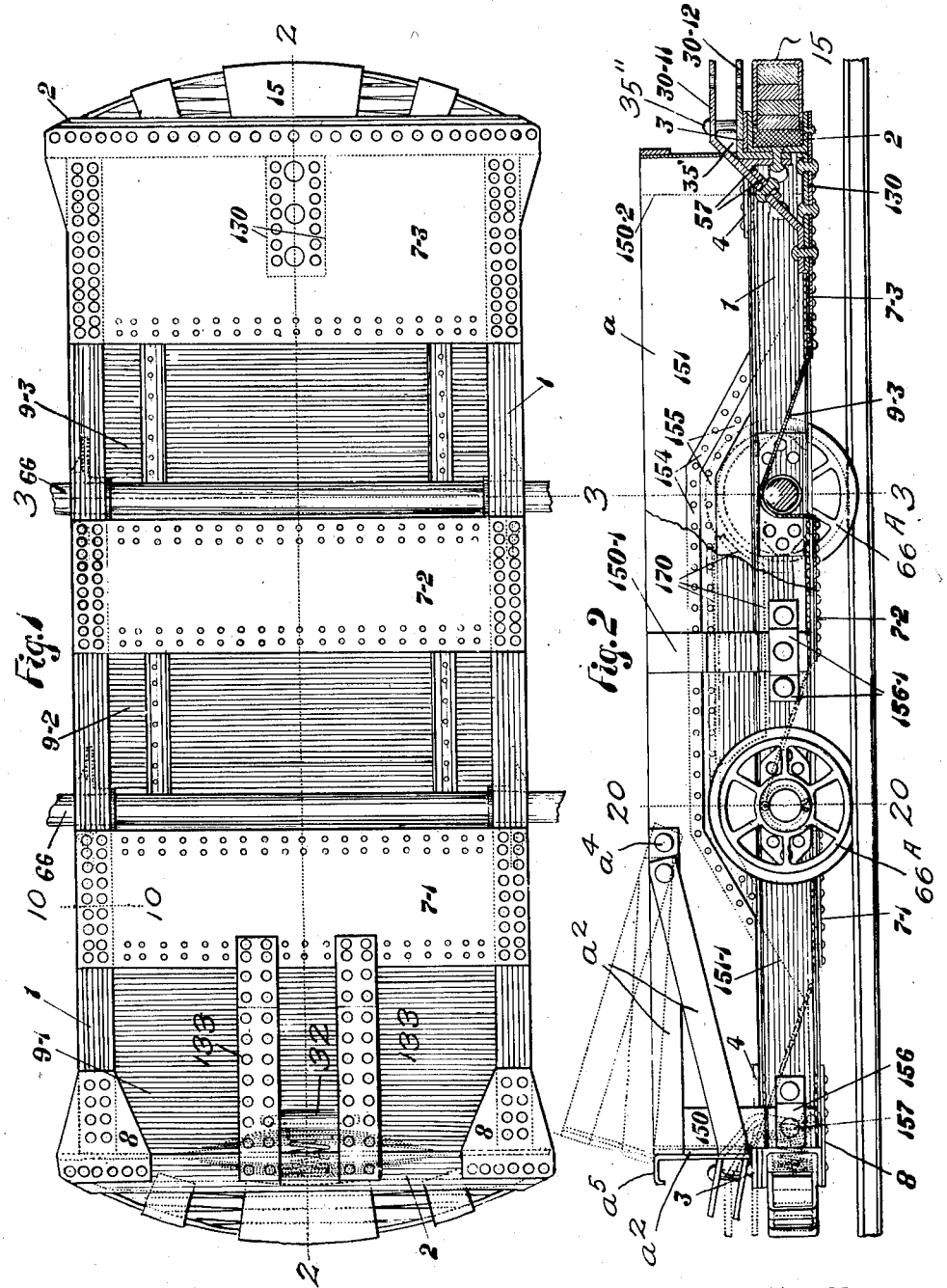

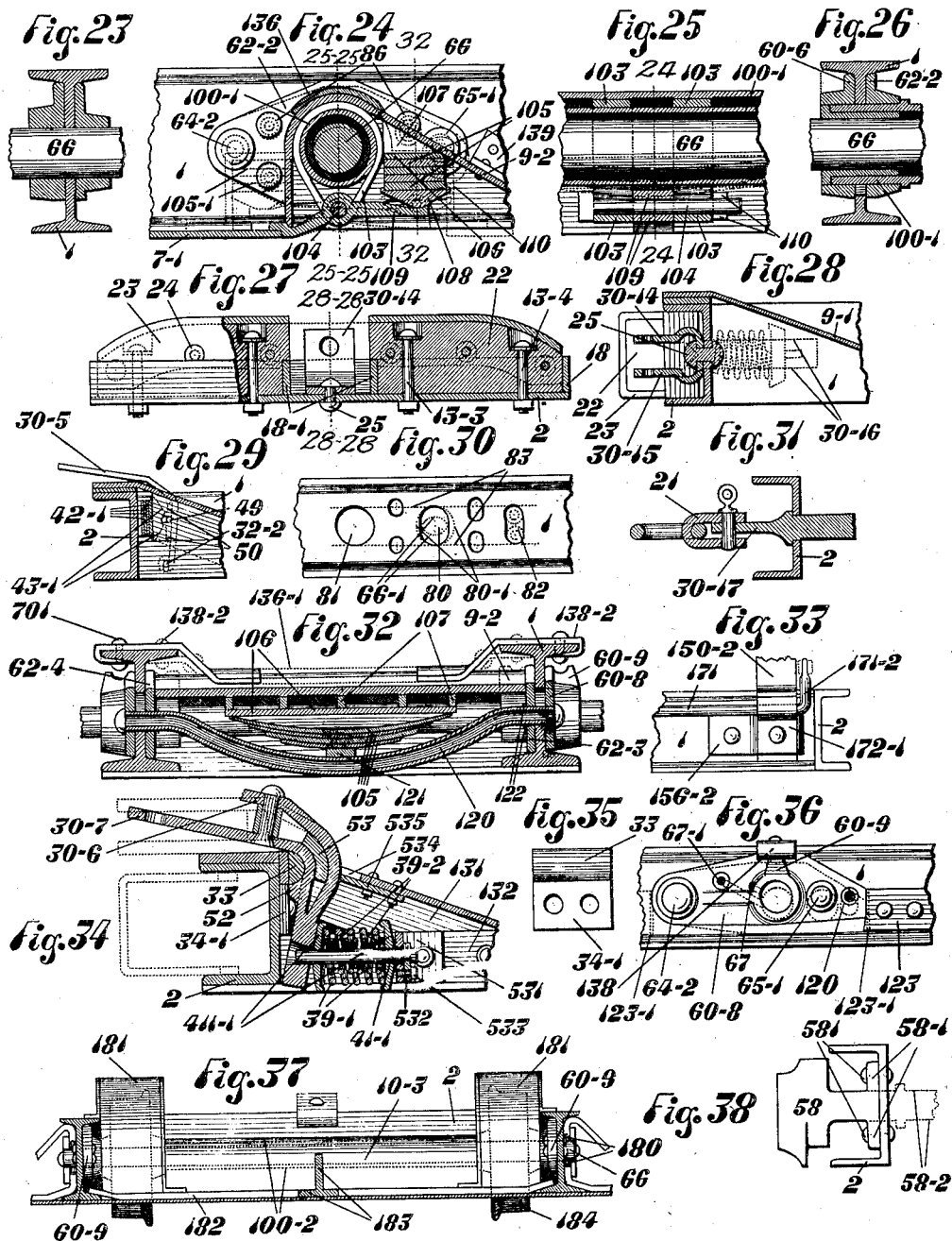

Patented May 29, 1934

1,961,017

UNITED STATES PATENT OFFICE 1,961,017

MINE OR OTHER CAR

Audley H. Stow, Charleston, W. Va., assignor, by mesne assignments, to Sanford Investment Company, Wilmington, Del., a corporation of Delaware Application November 15, 1920, Serial No. 424,132

REISSUED

180 Claims. (Cl. 105—364)

This invention relates to improvements in mine and similar rail cars.

The objects of this invention are to produce such a car in a form adapted to meet conditions and to function as hereinafter described, including adaptation to carry the largest load possible in given "out to out" dimensions prescribed by conditions in the mines—the width and height in passages through which extend the rail tracks to be traversed by the cars. Lading capacity depends on location of the mine car bottom or floor relative to the track rails and also on the thickness (or thinness) of the floor and also the length of the car and the form of body walls or upper structure rising from the floor. Increasing the lading capacity of the car by lowering the floor or bottom is a feature of this improvement. Increasing the length of said cars from former practice requires changes in structure in order to give the car stability or rigidity. In this connection, it is to be noted that in these cars a short "wheel base" is desirable, in order that the car may readily pass such short track curves as are ordinarily present in and at coal mines. The short wheel base is produced by placing the axles near each other, in order that the wheels at each side of the car will be near each other.

When a car is made longer and the axles are placed to produce such a short wheel base, each end of the car will extend outward beyond the adjacent axles, and the structure of the car must be such as to keep those ends from sagging or bending downward during operation of the car.

Building the car to carry a load extending closer to the rails and having greater length, calls for revising the structure of cars heretofore in use, to afford the required strength and durability. That variation for more capacity requires changes in organization, an important feature of which is placing the car floor or bottom low relative to the car axles, whereby the floor is placed as near to the track rails as is permissible.

A further object of the invention is to produce a car having a horizontal traction truck frame which is strong relative to the lading-retaining walls rising from the truck, in order that the truck may receive tension and compression strains during the operation of the car, while the lading retaining walls have merely enough strength or stability to ordinarily retain normal position but yield to abnormal strains tending to deform said walls and so avoid or limit transmission of strains to the truck under wreck conditions.

In mining practice, there are mine car wrecks similar to railroad wrecks, and there are also a large number of wrecks resulting from roof falls in the mines. In either kind of wreck, it is desirable to limit the damage done to the cars. The damage or loss is greater when the traction truck is destroyed. Then the removal of the wrecked car and the repair of the car lead to more delay and expense. In cars in which the side walls are arranged to take haulage strains, those walls are so strong as to tend to transmit ordinary wreck strains or roof fall strains to the truck, whereby the truck is broken or bent along with the wrecking of the side walls. Thus the car is difficult to remove from the mine and has almost no scrap value when so removed. In my improved car, I preferably avoid so constructing the car as to depend upon the side walls for taking haulage strains.

I preferably concentrate in the traction truck all the metal necessary to take care of the haulage strains, both tensile and compressive. And all the metal is so placed in the car as to give the maximum strength per pound of metal. I thus need only a relatively light and flimsy lading-holding upper body or structure which may be crushed by a fall of the roof and be readily removed from the traction truck with relatively trifling loss. If the fall of the roof occurs on one of my loaded cars, the car lading will more usually so cushion the fall of the roof that the traction truck will seldom be seriously damaged. When my improved cars are telescoped, the ends of the trucks will seldom hit so squarely as to prevent the trucks from sliding either under or over each other and so avoid serious damage to the trucks.

Some mine cars are constructed to discharge their lading by gravity, without tilting the car. Mine cars having displaceable bottom doors are of that kind. Other cars are tiltable for discharge of the lading by gravity. Of those there are some in which only a part of the car is tilted for discharging the lading. My invention relates to such cars as are tilted bodily—the entire car, including the truck, being tilted—either endwise or sidewise, for discharging the lading by gravity. My drawings illustrate an end-dump car constructed for such bodily tilting.

In mine operation, it is desirable to have the wheels free for rotation on the axles, in order that, on track curves, the wheels may freely turn independently of each other, the axles being at the same time free for slow or creeping rotation in axle bearings which are supported by the side beams or side sills, that slow turning being caused by slight fractional engagement between the wheels and axles. The purpose of that slow rotation of the axle is to avoid wearing by the wheels on only one part of the axle journals, as is the case when the axles do not turn.

Because, when, in my improved car the car axles are continuous from journal to journal, the floor is placed below the axles, whereby the axles are in the lading holding body, it is desirable to prevent the lading from making engagement with the axles in such manner as to interfere with the slow rotation of the axles. If the car is an end-dump car, it is also desirable to associate with the axles means for guiding the lading over the axles, without contact with the axles, when the car is tilted into the end-dumping position. Accordingly my improved car preferably includes axle deflectors and axle hoods and axle tubes which shield the axles from contact with the lading. If the car is an end-dump car, as herein described, deflector plates placed over the axles and having sloping faces at the rear of the axles serve to guide the lading over the axles when the car is in the end-dump position; and when the car is in the horizontal position, those deflector plates keep the lading from lying on the axles and preventing rotation of the axles. If the car is to be turned sidewise for discharging its load, the sloping face of the deflector is not needed; but a hood-form cover may be placed over the axles to keep the lading from bearing upon the axles. In either form, these axle covers are to be made strong enough to avoid bending when large and heavy pieces of lading fall upon the covers. It is also to be noted that contact of lading with rotating axles is to be avoided, because such contact would grind the lading.

In the accompanying drawings:—

Fig. 1 is a bottom view of a traction truck constructed in accordance with my invention, the outer ends of the axles being broken away;

Fig. 2 is a partial sectional side elevation of my improved mine car, showing the lading holding body in its working position with relation to my improved traction truck, the rear end of the car being shown in longitudinal vertical section on the line, 2—2, of Fig. 1, certain parts being shown by dotted lines;

Fig. 3 is a vertical cross section on the line, 3—3, of Fig. 1;

Fig. 4 is a horizontal section taken on the line, 4—4, of Fig. 5;

Fig. 5 is a vertical section on the longitudinal middle line, 5—5, of Fig. 4;

Fig. 6 is an outer side view of a portion of the longitudinal side sill of my improved traction truck, showing the axle boxing in position;

Fig. 7 is a detail section on the line, 2—2, of Fig. 1, exposing an inside view of a portion of the said longitudinal side sill;

Fig. 8 is a vertical cross-section on the line, 8—8, of Fig. 6;

Fig. 9 is a detail, upright, longitudinal section showing another form of my bottom pivoted spring draw-bar;

Fig. 10 is a detail upright cross-section on the line, 10—10, of Fig. 1;

Fig. 11 is a detail, upright, cross-section on the line, 11—11, of Fig. 9;

Fig. 12 is a detail elevation of the end ship channel shown in Fig. 4;

Fig. 13 is a detail section of still another form of pivoted spring draw-bar;

Fig. 14 is an upright longitudinal section of a form of rigid draw-bar, as applied to the front of the car;

Fig. 15 is a detail upright cross-section of a reinforced belt or binder;

Fig. 16 is a detail section showing another form of reinforced belt or binder;

Fig. 17 is a detail section showing still another form of reinforced belt or binder;

Fig. 17A is a view similar to Fig. 17;

Fig. 18 is a detail upright longitudinal section showing a swinging draw-bar;

Fig. 19 is a detail section, on the line, 19—19, of Fig. 18;

Fig. 20 is a detail vertical cross section on the line, 20—20, of Fig. 2, showing a somewhat different style of axle boxing, from that shown in Figs. 6, 7 and 8;

Fig. 21 is a detail cross section of another form of axle boxing;

Fig. 22 is a detail vertical cross section on the line, 22—22, of Fig. 6 of still another form of axle boxing;

Fig. 23 is a detail section of still another form of axle boxing;

Fig. 24 is a detail vertical longitudinal section on the line, 24—24, of Fig. 25, showing an inside view of the swinging axle boxing which forms a portion of the spring wheel truck;

Fig. 25 is an upright cross-section through the center of the axle on the line, 25—25, of Fig. 24;

Fig. 26 is a detail vertical section on the line, 25—25, of Fig. 24;

Fig. 27 is a view similar to Fig. 4, showing solid end bumpers and a center draw-bar located between the upper and lower flanges of the end channel;

Fig. 28 is a detail longitudinal section on the line, 28—28, of Fig. 27;

Fig. 29 is a view similar to Fig. 28 of a still different style of bottom pivoted spring draw-bar;

Fig. 30 is a side view, on a smaller scale, of substantially the same portion of the longitudinal supporting side sill shown in Fig. 24;

Fig. 31 is a view similar to Fig. 29, showing a still different style of draw-bar;

Fig. 32 is a similar upright cross-section to that along the line, 32—32, of Fig. 24, showing, however, a different form of spring wheel truck;

Fig. 33 is a broken outside view of the rear end of the traction-truck, showing the arrangement of the wheel brake fulcrum rod;

Fig. 34 is a view similar to Fig. 5 of the preferred spring draw-bar;

Fig. 35 is a front view of the draw-bar half round filler and its base plate, which form the pivot of the center pivoted draw-bar;

Fig. 36 is a detail, outside elevation of the swinging or drop axle boxing shown in section in Fig. 32;

Fig. 37 is a cross section through a narrow gauge traction truck between the center car belt and the car wheel hoods, showing more particularly outside longitudinal supporting side sills, together with one method of supporting the car bottom and axle hoods;

Fig. 38 shows one form of an automatic car-coupling device riveted to the end channel.

In all longitudinal views, the left hand end is considered the front end and the right hand end the rear end of the car.

The first part of the description will relate to combining parts to form a complete car, reference being mainly to Figs. 1 to 8, inclusive, and this part of the description being under main heads, as follows: (A) traction truck; (B) floor structure; (C) end structures; and (D) upper structure.

The traction truck comprises (a) longitudinal side beams or side sills, (b) end sills or end beams, (c) corner fastenings joining the side beams to the end beams, (d) wheels and axles, and (e) axle boxings supported by the side beams.

The floor occupies the space enclosed by the side beams and the end beams and makes connections with the side beams and end beams, as will be explained further on.

The end structures are composed of the end beams and auxiliary bumper and coupler elements, as will be described further on.

The upper structure comprises the lading retaining walls extending upward from the side beams and the end beams. In the form of car shown (an end dump car), the end door is a part of the upper structure.

The description of the complete car will be followed by a description of other forms of various parts of the car, such other forms being illustrated by Figs. 9 to 38, inclusive.

The traction truck

The longitudinal side sills consist, preferably, of common stock metal I-beams, 1 (Figs. 1, 2, 3, etc.); the rigid backing for the bumper being, preferably, metal ship-channels, 2. With the draw-bar, 30—11, 30—12, over the bumper as in Figs. 2 and 5, the maximum tensile haulage strain necessarily comes in line with the upper flange of said ship channel, which, for heavy service, is preferably reinforced by the metal channel reinforcing strap, 3, of approximately the width and length of the upper flange of said ship channel, to which it is suitably riveted. On the upper faces of the upper flanges of both I-beams, at both ends of the car, are preferably riveted the corner connecting plates or bars, 4 (Fig. 4), which extend past the ends of the I-beams so as to rest flush on top of the ends of the upper flanges of the ship channels and under the ends of the said reinforcing straps, raised sufficiently for that purpose. The king rivets, 5, (Fig. 4) are then passed through the raised ends of the channel reinforcing strap, 3, through the projecting ends of the corner connecting bars, 4, and through the upper flanges of the said ship channels, 2. The tensile haulage strains delivered by the draw-bar against the upper flanges of the ship channels and the attached channel reinforcing straps, 3, will therefore subject the said king rivets to double shear.

Within the rectangular frame formed by the side beams and the end channels, in each corner of said frame, is an upright angle connection, 6, having one flange bearing against the inner face of the web of the adjacent side beam and having its other flange bearing against the inner or back face of the end channel member, 2, the flanges of said angle connections being riveted to the members against which they rest.

Thus the side beams, 1, and the transverse ship channels, 2, are joined to one another. Additional means will be described which serve to further strengthen the connection between the side beams and the ship channel.

Although I have employed the term, "ship channel", to indicate my preference, it is to be understood that by this term I mean such a channel as is shown in my drawings, with ample flanges having parallel inner horizontal wall surfaces that will support the bumper element, 15, and permit it to compress in absorbing impact shock, without the pinching that would occur if the flange walls were tapered at their inner surfaces. My end channel, 2, is shown in Figs. 2, 5, 9, 13, 14, 18, 28, 29, 31, 34 and 38, to have the flanges and also the web plates of such proper form.

If the bumper channel, 15 (Fig. 5) for example, fits snugly within the end channel, 2, as shown, obviously, the bumper channel may be more readily inserted within the end channel, if the inner free edges of the flanges (those facing each other) are rounded, as shown, instead of being square. On the other hand, the end channel will, obviously, be stronger, if the outer corners, where the flanges and web plates meet, are square, as shown, instead of rounded.

For the smaller cars used in thin vein coal mining, a metal six inch I-beam is about the right size, and as it happens, just about gives a bumper which closely matches the height of the old all-wood bumper and yet gets the bottom of the bumper down to within say three and one half inches of the top of the rail, which is as close as is otherwise practicable. In the same way, for the heavier cars of my type, the eight inch I-beam is the right size, which also makes the top of my bumper fit the top of the old all-wood bumper of this size car, while still putting my car bottom down within say four inches of the top of the rail.

While the longitudinal side sills of my traction-truck may be constructed from other forms of structural steel, or may be composed of sectional built-up or composite beams, I prefer to use the common stock I-beams, as shown in the several drawings, and which are admirably adapted for the purpose.

The axles and wheels

The frame composed of the side beams and the end members is supported by the two car axles, 66. The axles extend through the side beams or sills, 1, 1, so that each axle is above a part of the beams and below a part of the beams (Figs. 1, 2, 3, 23, 24 and 32). As described further on, the axles pass through axle boxings applied to the side beams or sills in alignment with openings in the side sills. Said axle boxings are also shown extending through openings in the side sills, as will be described further on.

On each axle are two wheels, 66—A. In Figs. 1, 2, 3 and 32, the axles extend outward through the side beams and axle boxings and receive the wheels at the outer sides of the side sills.

The axles are placed at opposite sides of and equidistant from the upright, transverse, middle plane of the car, the distances of the axles from that plane being so short as to leave a considerable part of each end of the car projecting beyond the axles, whereby the car is supported in three parts, one part being between the axles, another part being forward of the front axle, and another part being rearward of the rear axle. This arrangement places the wheels near each other relative to the length of the car and gives the car a "short wheel base". To that feature, reference is again made further on.

The axle boxings are next described.

Axle boxings

For the first form of axle boxings, reference is made to Figs. 1, 2, 3, 6, 7 and 8.

Owing to the severe strain on the axle boxings, when the wheels hit the horns in the tipple structure during the end-dumping operation, there is a tendency to shear off the axle boxing rivets, if the axle boxings are cast in halves and merely riveted flatwise to the upright webs of the I-beams. The rivet holes are necessarily somewhat larger than the rivets, in order that the rivets may be readily and quickly inserted, while hot. Necessarily therefore, when the rivets are cool there is a certain amount of play, which permits the starting of shearing action of the axle boxing on the rivets. This may be remedied by my improved removable interlocking axle boxing shown in Figs. 6, 7, and 8. In those drawings the axle boxing consists of the axle bearing proper, 60, (Figs. 6 and 8) at right angles to and in the center of a face plate, 60—1, parallel to and fitting against the outer face of the vertical web of the I-beam 1. Two horizontal angular webs, 60—2, one on either side of the axle bearing proper serve to reinforce the bearing. The face plate, as shown, extends down from the upper flange of the I-beam, 1, to the lower flange of the said I-beam; the said face plate, and the adjacent vertical web of the I-beam being perforated to receive a suitable number of rivets, 64, 65, to hold the axle boxing in place during service.

The axle bearing proper has a cylindrical inward extension, 60—3, which just neatly fits the hole in the web of the I-beam prepared to receive it, and which therefore may be termed the axle interlocking extension. (Figs. 7 and 8). Fig. 7 shows the inner face of the I-beam. With this arrangement, therefore, the axle boxing interlocks directly with the web of the I-beam, and may be machined so as to secure what is termed, in bridge practice, the full pin value of the said inward extension, 60—3, of the axle bearing proper.

The axle bearing proper, 60, (Fig. 8) has preferably a broad wheel bearing or outside vertical face, as shown, the axle bearing proper being conical from said wheel bearing toward the face plate, 60—1, (Fig. 6) so as to give as broad a base as practicable, where the axle bearing proper merges into said face plate, the several parts of the axle boxing herein described being cast in one piece.

For the heaviest service, cast steel boxings are preferable, but for medium or light service properly designed cast iron boxings are sufficient. For rigid cast steel axle boxings rivets are preferable. The cooling strains incident to riveting may, however, result in the fracture of cast iron axle boxings, so that, with cast iron boxings, bolts and lock-nuts are preferable. Cast iron axle boxings should be readily removable as shown, in case of breakage. If made of cast iron secured by bolts and lock-nuts, the axle boxing, if broken or worn out, may be removed and replaced by a new one.

There may be a reinforcing plate, 61, (Figs. 7 and 8) on the inner side of the I-beam, and in a position corresponding to the axle boxing face plate, 60—1, (see dotted lines, 61, Fig. 6), the cylindrical inward extension, 60—3, of the axle bearing proper also extending through said reinforcing plate (see Fig. 8). The reinforcing plate, 61, will tend to compensate for the metal removed to permit the insertion of the axle, 66, and axle boxing rivets, and will, in addition, give a double shear value to the rivets. The inner reinforcing plate, 61, may, however, be entirely omitted (see Fig. 21).

An oiling duct, 67, (Fig. 6) may be conveniently placed in the axle bearing proper, just above the angular web, 60—2, and slanting downward, as shown. In practice, however, it is usually found that sufficient oil leaks in from the adjacent loose wheels to answer the purpose of lubricating the axle boxing. In this connection it is to be remembered that, preferably, the axles are to be given only a slow turning in these bearings.

*Axle tubes*

A tube surrounding the axle is of advantage in several ways. If the tube, 100, (Fig. 20) is connected with what may be termed the inner axle bearing, 62, by means of the pipe coupling, 101, the I-beams will be rigidly held in place under the compressive haulage strains. In addition to such bracing action by the axle tube, it may prevent downward denting of the crown of the axle deflector, 9—2, by rock or large lumps of coal falling on said crown. Thus the axle tube serves to brace the side beams and to protect the axle.

*Car floor or bottom*

The car floor or bottom is preferably formed of horizontal metal plates and axle covers or deflectors and bumper end structure deflectors. The horizontal plates are the approximately rectangular metal plates, 7—1, 7—2 and 7—3 (Fig. 1, etc.), also herein termed spaced-apart lading bottom portions.

The end edges of the plates are shown bearing against the lower parts of the I-beams and riveted to said parts of said beams, and the plate, 7—3, underlapping the lower flange of the rear end channel, 2, and being riveted to said flange. The forward corners of the traction truck are further reinforced on the under side by the metal corner bottom plates, 8, the space between the bottom sheet, 7—1, and the front bumper being filled by the metal bumper deflector plate, 9—1; the metal front axle deflector plate, 9—2, filling the space between the forward bottom plate, 7—1, and the middle bottom plate, 7—2; the metal rear axle deflector plate, 9—3, filling the space between the middle bottom plate, 7—2, and the rear bottom plate, 7—3; the several parts of the traction-truck being riveted or otherwise suitably attached together. It is to be noted that the spaced-apart lading bottom portions, 7—1, 7—2, 7—3 (Fig. 1) are approximately horizontal, whereas the bumper deflector plate, 9—1, and the axle deflector plates, 9—2, 9—3, also serve as lading bottom or floor portions, but may, obviously, also be termed, for the purpose of distinction, lading bottom or floor portions which are inclined longitudinally of the car.

Where the service is unusually severe, the traction-truck will be somewhat stronger, if it is completely sheeted over on the under side from end to end with plates like the plates, 7—1, 7—2, 7—3, or such a single plate, the deflector plates in such construction serving mainly as deflector plates. But substantial economy in material will be gained by so designing the deflector plates that they will also serve as parts of the traction truck bottom or floor, where the service for which the particular car is designed, permits.

With cradle dump mine cars, the traction-truck is also preferably sheeted over at the under side from end to end, the deflector plates proper being omitted, and other members being substituted, as described further on.

*Deflector plates*

There are two main varieties of deflectors plates: (first) the forward or bumper deflector plate, and (second) two axle deflector plates, both of which latter are preferably of exactly the same dimensions and construction for the sake of economy in shop work.

The forward or bumper deflector plate, 9—1 (Fig. 1, etc.), is inclined at such an angle with the horizontal, say twenty degrees when the car is level, that the said bumper deflector plate will be sufficiently inclined forward when the car is in the end-dumping position, usually forty five degrees, that the car standing on the forty five degree pitch will, with certainty under adverse conditions, start the coal that is on the bumper deflector plate. Therefore a twenty degree bumper deflector plate, when in the dumping position will have a pitch of twenty five degrees, ample for the purpose indicated. Coal, once started on a twenty five degree pitch, will not of itself come to rest on that pitch, which, for coal on sheet iron, is very nearly the angle of repose.

The lower, rear edge of the bumper deflector plate, 9—1 (see Fig. 5), is preferably riveted to the upper forward face of the forward bottom plate, 7—1; and the forward upper end of the said deflector plate is extended over the channel reinforcing strap, 3 (see also Fig. 4), and suitably riveted, together with the said channel reinforcing strap, to the upper flange of the front end channel, 2.

The lower, rear edges of the two axle deflector plates, 9—2 and 9—3, are also, preferably, riveted to the upper, forward faces of the corresponding bottom plates, 7—2 and 7—3, this being similar to the attachment of the bumper deflector plate, 9—1, last above described.

The axle deflector plates, as shown, are to be regarded as deflector plates proper, and they may also be termed axle hoods. In order to avoid the lading binding against the axle, and thus preventing the axle from rotating in its bearings, each deflector plate proper is preferably extended up over its axle and back down partially around the axle to a vertical position from which it is extended downward to meet the adjacent bottom plate, and then bent forward at right angles (see 10—1, Fig. 7) so as to rest on the bottom plate to which it is suitably attached, as by riveting.

Thus the axle deflector plates usually consist of two structural features or parts, to wit: the sloping or inclined axle deflector plates proper, 9—2 (Fig. 7), and the axle hoods, 10—1, which two parts may of course be made separately and suitably united.

*Axle hoods*

In the case of cars dumping sidewise, sloping deflector plates, properly speaking, will not be required. The axle hoods will, however, be required to keep the lading from so binding the axles as to prevent their turning.

Axle hoods, properly speaking, preferably consist of an inverted U-shape trough (see dotted lines 10—2, Fig. 6). The complete axle hood required or suited for sidewise dumping cars is preferably supported and reinforced in the same manner as above explained regarding the axle deflector plates.

*Crown reinforcing*

Where the car is to receive large pieces of rock, (in the absence of the axle tubes, 100, above described (Fig. 20)) the crown of the axle deflector plates may be so dented as to bear on the axle underneath and prevent the axle from turning. To avoid such denting, each plate may be reinforced, as by a long concave metal strip, 136, (Fig. 24) parallel to and resting on said crown, and riveted thereto, and extending over at least a material part of the length of the crown. This reinforcing plate may be placed against the under face instead of on the upper face of said crown.

The I-beams, 1, as already stated, must be held rigidly in line, under compressive haulage strains to insure the development of their full strength. This may be accomplished in a number of ways. For example, the lower bend of the forward part of the deflector plate, 9—2, (Fig. 7) in combination with the rear edge of the center bottom plate, 7—2, riveted to the lower flange of the I-beam, 1, and said lower bend being riveted to the plate, 7—2, make a most efficient angular cross brace, sufficient to insure the maximum strength of the I-beam in so far as its lower flange is concerned. It, therefore, is only necessary to insure the correct alinement of the upper flange of the said I-beam. That may be done in several ways.

As shown in Figs. 7 and 10, the angle plate, 137, (also dotted lines, 137, Fig. 3) is riveted to the vertical (forward) face of the axle deflector plate, 9—2. The other leg of the said angle plate is placed in position against the inside reinforcing plate, 61, and riveted by the same rivets, 64, as are used for the inside reinforcing plate, 61, thus holding the web of the said I-beam in the desired position, and causing the alinement of the upper flange of the I-beam.

The same result may be obtained simply by means of the I-beam or side sill bridle, 138, (Fig. 10 and Fig. 32) consisting of the main upper bridle, 138, and the lower bridle, 138—1. The upper bridle has one end turned over and down and back under the upper, outer I-beam flange edge, suitably fitted to securely engage the edge of said flange. From this point, the said upper bridle passes over the said upper flange, resting on the same, until the inner edge of said flange is reached, at which point it is turned down sharply, at say an angle of forty-five degrees to the horizontal, till it meets the crown of the axle deflector plate, at which point it is again bent horizontally. It is then also bent transversely, so as to conform to the curved crown or upper face of the said axle deflector plate, to which it is securely riveted. Evidently the upper I-beam or side sill bridle, 138, may be extended clear across the crown of the said angle deflector plate to form the axle deflector plate brace, 136 (Fig. 24) previously described.

The lower part, 138—1, of the I-beam bridle, 138, (Fig. 10) is shown as abutting against the upper edge of the reinforcing plate, 61, from which point it is extended horizontally until it meets the under sloping face of the upper part of the bridle, at which point it is bent downward to conform to the slope of the said upper part, to which it is then securely riveted.

The said lower part of the bridle is not particularly essential, as the sharp bend in the upper part, at the upper, inner I-beam flange edge will evidently keep the upper part of the I-beam from creeling or turning inward. In cases where the inside reinforcing plate, 136, is not used, the outer edge of the lower part of the bridle, if used, will of course be extended still further outward so as to bear against the vertical web of the I-beam.

The axle deflector plates may also be attached to the web of the I-beam by an angle connection,

139, (Fig. 24) riveted to the deflector plate and to the I-beam web.

A wood plank bottom in a traction-truck of this type usually necessitates a certain amount of added cross bracing, necessarily of metal to insure the alinement of the side sills under stress. The labor construction costs on small cross bracing is a relatively large item. Thick sheet metal flooring extended over the under side of the truck and secured to the side sills, will serve as a reinforcing and cross-bracing bottom, will reduce the labor costs on the cross bracing, will make a stronger truck, and will give the car an increased capacity, and has the further advantage, where the lading is wet slack, as often enough happens, of more readily and completely emptying the car of its lading than is done with a wood bottom.

The wood bottom may be made slightly cheaper than the sheet metal bottom, but the wood bottom can not well be made less than say one and one half inches thick, the bottom plank resting on the upper faces of the inner lower I-beam flanges, say one-half inch thick. By riveting say one-quarter inch sheet iron on the lower side of the bottom flanges, I gain a depth of say two inches lading capacity, which of itself will more than offset any slight difference in cost that may be in favor of the wood-bottom truck.

Axle deflector supports

As means for supporting or reinforcing the axle deflector plates, reference has already been made to the bridles, 138, (Fig. 10) and to the member, 136, resting lengthwise on the crown of the axle deflector (Fig. 24). The ends of the crown or upper part of the axle deflectors, may also conveniently be supported by the inner ends of the axle boxings or bearings, 60—3 (Figs. 2, 3, 7 and 8).

End structures

The main features of the end structures, comprising the channel, 2, and associated members, present in the car of Figs. 1 and 2, will now be described by reference to Figs. 1, 2, 4 and 5.

The simplest and most inexpensive form of spring bumper probably comprises several approximately parallel wood springs, flat wood strips, 11—1, 11—2, 11—3, and 11—4, on edge, i. e. with their greatest transverse dimension parallel to the vertical web of the end channel, 2. The ends of the wood spring, 11—1, next the said channel web rest against wood blocks, 12—1, (Fig. 4), and between it and the vertical channel web. In the same way, the ends of the wood springs, 11—2 and 11—3, rest on the wood blocks, 12—2, and 12—3, respectively, similarly placed. No wood block is however provided for the wood spring, 11—4, as its ends should come to a bearing against the next inner wood spring, 11—3, before the thrust against the center of the bumper forces the center of the inner spring, 11—1, against the adjacent vertical face of the channel web.

To hold the four wood springs in place against the end channel, four bumper bolts also herein termed bumper holding bolts, are provided, the two center bumper bolts being, 13—1, and the two end bumper bolts being, 13—2, (Fig. 4). The four bumper bolts are placed in the vertical centers of the four wood springs and the end channel. The two center bumper bolts are at right angles to the end channel and to the wood springs. The two end bumper bolts are approximately at right angles to the curved face of the bumper, and thus at an oblique angle with the channel and the angle member, 6, and the two angle bumper bolt nuts, 614, resting in the angles, 6, and having their outside faces parallel to the inner faces of the bumper bolt nuts, 614, thus giving said bumper bolt nuts a full even bearing. The two center bumper bolts are placed as close together as otherwise practicable, the two end bumper bolts being as far apart as practicable for the purpose indicated.

The wood springs are preferably shaped to form, when assembled, such longitudinally curved surface as may be desired for the service (see Fig. 4). In order to protect the outer vertical faces of the assembled wood springs, as well as in part to retain the wood springs in place, the metal bumper face strap, 14, (of a width approximately equal to the depth of the wood springs) is placed on the front face of the assembled wood springs, and curved to fit said front face, (see Fig. 4).

The bumper center plate, 15, (Fig. 4) which may be termed the bumper proper, is of substantially the usual construction, curved horizontally and U-shape in vertical cross section. As said plate, 15, forms an approximate arch and is therefore non-flexible, it is preferably as short horizontally as is practicable for the purpose. The upper and lower faces of said center bumper plate, 15, are spaced to embrace the bumper face strap, 14, and the four wood springs above referred to, and yet pass between the upper and lower flanges of the end channel, 2, (see also Fig. 5) without undue friction, which upper and lower flanges therefore serve as a guide to permit the spring bumper to be pressed inward, and yet prevent the bumper from being forced upward or downward.

The bumper side plates, 16, which may be two or more in number, are similar in cross section to the bumper center plate, 15, but relatively short horizontally, and preferably united to the bumper face strap, 14, by the double countersunk rivet, 17, (at right in Fig. 4). The bumper side plates, 16, also embrace the wood springs and pass between the upper and lower flanges of the end channel, 2, as in the case of the bumper center plate, 15, as previously explained.

Evidently with the said wood springs, the said bumper face trap, 14, with its attached bumper side plates, the wood spring blocks, and the bumper center plate, 15, all in place, the insertion of the said four bumper bolts, 13—1 and 13—2, will only require the screwing on of the four bumper bolt nuts, 614 (Fig. 4), to hold the spring bumper in place during service. The removal of the four bumper bolt nuts, will permit the removal of the entire spring bumper, and its replacement when renewed or repaired, or its replacement by some other similar form of spring or solid bumper.

Broken wood springs can be readily replaced by new ones; or a block or blocks may be placed in the center, between the spring, 11—1, and the vertical web of the end channel, 2, and of the same thickness as the end blocks, 12—1, thus converting the wood spring bumper into a solid wood bumper.

The wood springs are preferably tapered to bend near their ends, instead of near the center bumper bolts, 13—1, thus minimizing the tendency of the springs to break at said center bumper bolts.

In going around curves, in compression, the compressive haulage strain results in a sidewise thrust tending to force the bumpers to slide longitudinally along the face of the end channel. Hence the object in placing the two end bumper bolts at a substantial angle to the end channel, 2, is to tend to counteract this sliding tendency of the bumpers, which, however, is more directly overcome or resisted by means of the two end bumper plates, 18. These plates, 18, are U-shape in cross-section and extend between and are secured to the upper and lower flanges of the cross end channel, 2. The vertical connecting part of the end bumper plate, 18, is that shown in section in the right of Fig. 4.

As the wood springs are not designed to bend materially between the center bumper bolt holes, they may be spiked or nailed or otherwise suitably attached together, thus forming practically a solid wood bumper when the spring bumper finally comes to rest against the cross end channel, 2.

There is actually less wood in the wood springs, than in the wood beam out of which a solid wood bumper is hewed. While the smaller sizes are also cheaper than the larger size solid member, the labor costs of the spring bumper about offset the saving in material, thus leaving the cost of the two substantially the same. For this reason, both bumpers are shown flexible in Fig. 1, although evidently one bumper may be made flexible and the other solid, if preferred.

While the foregoing end structure description applies to the end structure at either end of the car, the draw-bars are so associated with the end sill, 2, as to become parts of the end structure. At the rear end of the car, a rigid draw-bar is made a part of the end structure in a manner to also brace the end channel, 2. At the front end of the car, a spring draw-bar is made a part of the end structure in a manner to also brace the end channel, 2. The rigid draw-bar at the rear end of the car and the spring draw-bar at the front end of the car will be described further on.

*Traction truck bracing*

It has been convenient, for the purpose of illustration, to show the flanges of the end channel, 2, (Fig. 5) for example, of such a width that it may be obvious that the bumper channel, 15, is suitably supported in working position, and yet slidable longitudinally of the car when the spring, 11—1, 11—2, 11—3, 11—4, is in compression, as when a trip of cars is being pushed up hill.

Where the service is severe, it is important to brace the end channels at or near the center, thus obviating the necessity for excessive increase in the dimensions of the end channels. This center bracing incidentally serves other useful purposes. I however do not wish to be restricted to center bracing as the only means of taking care of the heavier haulage strains incident to more severe service, nor do I wish to be restricted to the relative dimensions of end channel shown in the drawings, selected as convenient for purpose of illustration.

It has already been stated that the bumper deflector, 9—1, is joined to the upper part of the forward end channel, 2, whereby the entire upper part of that channel is braced or reinforced. It has also been stated that the floor-plate, 7—3 (Figs. 1 and 2) is secured to the lower part of the rear end channel, 2, whereby all the lower part of said channel is braced or reinforced.

As shown in Fig. 2, the draw-bars, 30—11, 30—12, reinforce the upper member of the rear end channel, 2. The lower member of said rear channel may be further reinforced by means of a strip of sheet metal, 130, also herein termed a lading bottom end member, riveted to the upper face of the rear floor plate or sheet, 7—3, the rear end of said strip of sheet metal abutting against the lower vertical face of said channel, 2, at which point said strip may be bent upward, as shown, to give a better bearing (Fig. 2). The said strip of sheet metal, 130, is placed in the transverse center of the car and preferably extends forward at least to the forward end of the upper draw-bar member, 30—11, in order that it may be suitably riveted thereto as shown (see also dotted lines, 130, Fig. 1).

The front end channel, 2, is preferably reinforced, top and bottom, in much the same way. As shown in Fig. 5, the inclined angle irons, 131, one on either side of the spring draw-bar, 30—1, 30—2, brace the upper flange of the front end channel against compression, in the same way the rear draw-bar braces the rear channel. Said angle irons, 131, are riveted to the under side of the bumper deflector plate, 9—1, and abut at their forward ends against the upper rear face of the front end channel, 2. The upper flange of the front end channel is, as already stated, reinforced against tensile haulage strains, by the bumper deflector plate, 9—1, riveted thereto.

The lower flange of the front end channel is similarly reinforced against compression by the horizontal angle irons, 132, one on either side of said spring draw-bar, 30—1, 30—2. In order in part to maintain the said horizontal iron, 132, suitably in place, it is riveted to a flat strip, 133, the front end of which is in turn riveted to the under side of the lower flange of the front end channel while the rear end of said strip abuts against the front edge of the front bottom plate, 7—1. A connecting plate, 134, overlapping and riveted to both said strip and plate, 7—1, serves also as a brace against tensile haulage strains.

The inclined angle iron, 131, and the horizontal angle iron, 132, may to advantage be riveted together at their overlapping rear ends as shown. Both the said angle irons may to advantage be so placed as to form lateral guides for the said spring draw-bar, 30—1, 30—2. The lower horizontal angle iron, as shown, serves as the pin seat for the draw-bar pivot pin, 32. (Figs. 4 and 5.)

The thrust of the lading against the bumper deflector plate, 9—1, when the car is being dumped endwise would tend to bend said plate in the direction of said thrust, were it not for the inclined angle bar supports, 131, previously referred to. The axle deflector plates proper, 9—2 and 9—3, (Figs. 1 and 7) should also be reinforced, preferably by similar inclined angle bar supports, 135, riveted on the under side of the said axle deflector plates, and also running parallel to the length of the car.

As shown in Fig. 2, the draw-bar composed of the bars, 30—11, 30—12, reinforces the upper member of the rear end channel, 2.

The swinging draw-bar housing hereinafter described, evidently is also well adapted to serve as a compression brace for the end channel, and may be suitably attached to said end channel to enable said channel the better to resist the tensile haulage strains.

With suitable bumper top center bracing, the channel reinforcing strap, 3, may be omitted for medium or light service.

*Rigid draw-bars*

Both the front and rear draw-bars may be either spring or rigid draw-bars, as may be desired, for any particular service. For general use however, in part on the score of economy, one spring draw-bar and one rigid draw-bar (as shown in Fig. 2) is the preferred construction.

The simple form of rear rigid draw-bar, shown at the right in Fig. 2, consists of the upper member, 30—11, the lower member, 30—12, and the angle connecting bar, 57. The upper ends of the rigid members, 30—11 and 30—12, are parallel to each other, and maintained the distance apart suitable for the service, by any suitable draw-bar filler, as 35′ (Fig. 2). The draw-bar filler, 35′, is retained in place by the rivet, 35″, passing through both draw-bar members. At a suitable point from the upper rear end, the upper member is bent forward and downward, at say an angle of forty five degrees, until it reaches the car bottom, at which point it is again bent forward so as to rest on the car bottom or car bottom bracing, to either of which, as the case may be, it is suitably riveted. Figs. 1 and 2 show said member resting on the plate, 130, and secured by rivets extending through the member and the plate, 130, and the floor plate, 7—3, as described under—traction truck bracing.

The upper rear end of the lower rear member, 30—12, rests on the upper face of the end channel reinforcing strap, 3, at the forward edge of which it is bent downward, at right angles, so as to bear against the forward face of the rear channel and extend downward well past the vertical center of the said end channel.

The upper rigid member, 30—11, is so placed that the forward and downward extension thereof bears against the right angle turn in the lower rigid member, 30—12, and thus forming an angle of approximately forty five degrees with the lower end of said lower rigid bar. The angle connecting bar, 57, is so bent that it fits neatly into this forward and downward extending angle between the two rigid bar members, and is of such length that the forward leg of the angle connecting bar, 57, may be securely riveted to the sloping portion of the upper rigid member, while the rear vertical leg of said angle connecting bar, 57, may also be securely riveted to the vertical portion of the lower member and also to the end channel, 5, all substantially as shown in Fig. 2. Thus the upright parts of the draw-bar 30—12, and the angle bar 57, form vertical end thrust means.

Evidently, the upper rigid bar member as shown, may be made to utilize the strength of the car bottom, 7—3, as well as the strength of the end channel, 2, in resisting the tensile haulage strains; whereas, when the haulage strains become compressive, my improved rigid draw-bar, as shown, serves equally as a most admirable brace to the upper flange of the end-channel.

The width between the I-beams, which preferably form the longitudinal side sills of my improved traction truck, will seldom be less than say three feet, while the steel bottom should be about one quarter inch sheet steel, and thus equivalent to a bar of steel say four inches wide and say two and one quarter inches thick. With this bottom sheet properly riveted or otherwise secured in place in relation to the side beams, it is evidently a most substantial element of strength to which the bumper and draw-bar may be very properly attached and braced when desired.

Evidently the said rigid draw-bar may serve as a most admirable bumper brace for the top flange of the end channel, in the center where it is most needed, for both compressive and tensile haulage strains, as herein designated, no other bracing for the said top flange being necessary, certainly not for medium and light service. For these reasons the rigid draw-bar may also be correctly designated as of the reinforcing draw-bar type.

*Bottom pivoted spring draw-bars*

The double draw-bar has been selected for the purpose of illustration, but may be single as in Figs. 29 and 31. The rather simple front spring draw-bar, shown in Fig. 5, consists of the upper member, 30—1, and the lower member, 30—2, preferably united by the double counter-sunk rivet, 31. The lower end of the upper member is looped around the draw-bar pivot-pin, 32. Both the upper and lower members are preferably so bent that the draw-bar will come to rest, when pulled forward, on the half-round filler, 33, which rests on the base plate, 34, secured to and arranged at the upper rear corner of the channel, 2. (Figs. 5 and 35).

The upper and lower members (Fig. 5) begin to separate at say forty five degrees, at the point where they pass around the upper edge of the said half-round filler, 33. The draw-bar filler, 35, is placed between the said upper and lower draw-bar members where they begin to spread, the said draw-bar filler being of such width that the two said draw-bar members are the distance apart desired for the suitable operation of the link coupling held in place by the coupling pin, 36. The said draw-bar filler is retained in place by means of the rivet, 37, passing through both the draw-bar members. The said rivet, 37, may also have a short section of pipe, 38, around it and between the draw-bar members to further insure the exact distance apart desired.

Both the upper and lower draw-bar members are so bent, when they are pulled to their extreme forward position, and thus rest against the said half-round filler, 33, the forward portions of said upper and lower draw-bar members are parallel to each other and also parallel to the channel reinforcing strap, 3, upon which the lower-draw-bar member rests.

The coil spring, 39, is so placed about midway vertically of the end channel, 2, that the rear end of the said coil spring bears against the nearly vertical portion of said double draw-bar. About midway between the said half-round filler, 33, and the draw-bar pivot 32 (as shown in Figs. 4 and 5) the said coil spring, 39, passes through the end channel, 2, through the circular hole, 412, in the channel (see also Fig. 12), the front end of said coil spring bearing against the bearing plate, 40, attached to the inner wood spring, 11—1.

In order to maintain the said coil spring, 39, in its proper relation to the several parts, a circular angle bearing plate, 411, is placed at either end of said coil spring. The coil spring pin, 41, is shown inserted in a suitable recess in said double draw-bar and in a corresponding recess in said bearing plate, 40, and through the centers of the said circular angle bearing plates, 411.

The coil spring, 39, thus serves a double purpose, in that, under compressive haulage strains, it reinforces the spring action of the wood spring bumper, while under tensile haulage strains, the said spring serves to give a spring action also to the double draw-bars. The hole, 412, in the end channel, 2, necessitated by the coil spring, (see Fig. 12) will not materially weaken said channel, particularly for light service.

With the lower end of the double draw-bar pivoted for bodily rocking, during such rocking there is a change of angular relation between the draw-bar and spring and the rear circular angle plate, 411, to accommodate which the face of the rear circular angle bearing plate, 411, is made suitably conical, as are the holes in which the coil spring pin, 41, rests, the middle portion of the said coil spring pin, 41, being made of a larger diameter than the holes in the angle bearing plates, 411, so that the pin cannot drop out. (Fig. 4).

The bumper deflector plate 9—1 (Fig. 5) is slotted in the center to permit the desired backward and forward action of the upper part of the double draw-bar. The lower pivoted end of the double draw-bar is held between parallel stationary guides, 132, provided in part for that purpose, and through which the draw-bar pivot pin, 32, is passed. Once the several parts are in place, the insertion of the said pivot pin will evidently insure their being maintained in working position during service; and the removal of the draw-bar pivot pin will permit the removal of the several parts.

Upper structure

The upper structure comprises the lading retaining walls and the side floors extending laterally from and supported by the side beams.

In order to gain capacity, the side lading body has heretofore been so placed below the top of the wheels as to require wheel hoods over the wheels to permit their rotation in service. I therefore do not broadly claim this arrangement, which is seriously objectionable for several reasons, one of which is, the wheels cannot be removed until the axles are punched or pushed out, which is not always readily done. Then, too, when a car is derailed, workmen cannot, on account of the low sides, get under the car to rerail the car.

The belts or binders, usually three or four in number, are so bent and placed as to support and give the lading holding body its desired shape and position. These belts are usually all bent near enough alike, so that the car has substantially the same transverse cross section throughout.

With my improved traction truck, a large portion of what may be termed the lading holding body is that portion of the car outside, and usually above, the traction truck.

My improved wheel-recessed wing lading holding body, a, has a middle transverse cross section sufficiently high off the rails to permit the ready removal of the wheels, in the usual manner, without changing the position of the axles. This same transverse cross section is preferably maintained either way from the center to such a distance on either side of the wheels as will leave ample outward clearance for the wheels, without the hindrance offered by axle hoods. This also gives the workmen chance to get under the center of the car where work is needed to be done, in order to rerail the car. This arrangement also gives room between the wheels for the usual style wooden brake block, which cannot well be used in connection with wheel hoods.

As shown in Fig. 2, my improved lading holding body has, at each side of the car, a front belt, 150, a center belt, 150—1, and a rear belt, 150—2. (Figs. 2 and 3.)

The lower, upright part of each belt rests flatwise against the outer face of the web of the adjacent I-beam, 1, and bears against the adjacent lower flange and against the adjacent upper flange of the I-beam. At said upper flange, each belt is bent outward, the middle belts, 150—1, being bent outward only far enough to be bent upward across the upper flange, and the other belts being extended horizontally from said upper flange farther than is the case with the belts, 150—1, as will be described further on. The part of each belt which lies between the I-beam flanges and against the web of the I-beam is secured to the I-beam by means of a transverse bracket plate, 156, lying against the outer face of the belt and being bent to lie against said web. Said bracket plate is secured by means of rivets, 157, extending through said plate and said belt and the web of the I-beam and through said plate and said web (Figs. 2 and 15).

The center belt, 150—1, is extended upward from the outer edge of the upper I-beam flange into a horizontal plane sufficiently high to clear the tops of the wheels the desired distance. Thence said belt is extended outward, horizontally to the desired lateral mine clearance. There it is bent upward to the desired vertical mine clearance.

The two parts of the lading holding body which extend over the wheels, on either side, (see Fig. 3), are usually termed the wings of the car. As it so happens, the top of the I-beam will, under usual conditions, be about as low as the wings of the car can safely be made. The front and rear belts, 150 and 150—2, are therefore preferably extended outward horizontally at the level of the top flange of the I-beam, similar to the special reinforced belt, 150—3, (Fig. 15) (this extension being outward as far as the outward extension of the belts, 150—1), and thence upward to the height of the belts, 150—1. Thus, in each of these four belts, 150 and 150—2, there is a saving of two bends compared with the belts, 150—1. Thus the outer, upright parts of the belts, at each side of the car, are in a common plane which is upright and parallel to the length of the car. And it is to be noted that the horizonal parts of the belts, 150 and 150—2, are approximately at the height of the upper flange of the end channel, 2, or the reinforcing strap, 3, resting flatwise on said flange; for said parts of said belts and said flange or strap are each approximately at the height of the upper flanges of the I-beams. This feature is to be further mentioned in connection with the provision for the discharge of the lading when the car is of the end-dump kind.

Owing to the difference in the heights of the wings of my improved lading holding body above the wheels and forward and rearward of the wheels (see Fig. 2), the wings may be said to be longitudinally recessed upward in the center, and may therefore be said to be wheel recessed. Owing to this longitudinal recess in the center, the sheet metal lining of the wings cannot well be made out of one piece bent to conform to the shape of the belts, but is preferably made out of say three strips of sheet metal; the upright, outside strip, 151, the center horizontal strip, 152, and the upright, inside strip, 153. (Figs. 2 and 3).

The lower part of each upright, outside strip or sheet, 151, is preferably as long as the side beams and recessed to give the desired clearance for both wheels and having its lower edge resting on the three adjacent belts and rising to the height of said belts, as heretofore described. The center horizontal strip or sheet, 152, is preferably as long as the side beams and so bent that its outer, side edge will meet the lower edge of the sheet, 151, and will rest on the three belts.

The strip or sheet of metal made by recessing the outside sheet, 151, will evidently be of correct shape to serve as the inside strip, 153, so that my improved wheel recessed car wings do not involve any waste of sheet metal in the cutting.

The sheets, 151, 152 and 153, are joined to each other by angle irons, 154 and 155. These angle irons, 154 and 155, are bent to conform to the lower edge of the outside strip or sheet, 151, above described. The vertical flanges of the angle irons, 154, extend upward from their horizontal flanges, whereas, with the angle irons, 155, the vertical flanges remain below the horizontal flange (Fig. 3).
With the several parts suitably assembled, it evidently only remains to rivet or otherwise suitably attach the several parts (the belts and sheets and angle irons) together.

As above stated, the horizontal parts of the belts, 150 and 150—2, are at approximately the height of the upper flange of the end channels, 2. Hence the ends of the sheets, 152, and said channel flange, are in approximately the same horizontal plane. Hence a sheet, a1, of parallelogram form may rest on the rear channel, 2, and the adjacent ends of the wing sheets, 152, and meet the outer sheets, 151, and be suitably secured to the adjacent members.

At the front end of the car, a door, a2, of parallelogram form is similarly placed relative to the channel and the sheets, 152, and the outer sheets, 151, and attached to arms, a3, placed beside the outer sheets, 151, and coupled thereto at a4, to permit lifting the door, as by engagement of a hook a5, supported on the door, as already known in this art.

When the car is tilted and the door is opened, the lading will discharge over the bumper deflector, 9—1, and over the forward ends of the wing sheets, 152. The rear slope of said sheets is to be such as will allow rearward lading to slide forward during dumping, as described of the axle deflectors.

From the foregoing it will be seen that the haulage strains, both tensile and compressive, are transmitted through the truck and not through the upper structure, the belts and the sheets of the upper sructure containing only enough metal to impart strength to support the lading, the upper structure being, therefore, adapted to yield to abnormal strains in excess of strains to be resisted for supporting the lading.

For convenience in designating or describing the position of the lading floor or lading bottom relative to the axles or the journals which are supported by the car wheels, the term, "axle plane", is herein applied to the horizontal plane which cuts or is closely associated with said journals, the lading floor or a substantial part thereof being below that plane. In the particular form shown by the drawings, this "axle plane" cuts the side sills between the upper and the lower parts of said sills.

It is to be noted that the car floor or bottom is so supported and secured in the body of the car as to adapt it to remain in stationary or fixed position relative to the "axle plane" during operation of the car—during the loading and transporting and unloading of the car, the unloading being effected by tilting the entire car bodily and discharging the lading from the car by the action of gravity. Accordingly it is to be understood that, as used in the claims, "stationary floor" means a floor which is supported and secured and remains in position during operation or service as above described. Thus used, the term, "stationary floor" or "stationary bottom" excludes cars from which lading is discharged by gravity by displacing the floor relative to the axle plane.

Regarding the lading floor or bottom which lies entirely or in part below the horizontal "axle plane", the term, "sub-axle" floor or bottom is applicable and is so used in some of the following claims, that term being used to distinguish from the old type mine cars in which the lading bottom is above and extends across the axles. The deflectors which guide the lading over the axles and to or over the end structure are to be regarded as parts of the car floor or bottom.

In mine car practice, the ends of the car are provided with means for joining or connecting the car to other cars to form trains or "trips". This means for joining cars is ordinarily mentioned as "coupling" for the cars. In these cars provision is also made for taking impact or pressure when cars are driven or pressed against one another. Such means are ordinarily called "bumpers" or "bumper means". In this application several forms of means for performing these two functions are shown and described, the means for the two functions being in part combined structurally. To these means it is appropriate to apply the term, "bumper and coupling means", and in some of the following claims that term is used with that meaning.

In mine cars of this general type, it is desirable to place the car axles sufficiently near each other to divide the length of the car into three parts, a middle part located between the axles and an end part reaching away from each axle, whereby the space between the wheels at each side of the car is relatively limited and makes what is termed a "short wheel base". For load distribution this positioning of the axles is desirable. Producing a "short wheel base" by this positioning is also desirable, because, as already herein stated, such a car having a short wheel base can better traverse short curves in such rail tracks as are ordinarily in service at mines. Furthermore, placing these axles to form a short wheel base, removes the wheels from the ends of the car where they will not interfere with the coupling and bumper means when cars are to be connected for operation as trains or "trips". By reference to the drawings, it will be seen that in my improved car the axles and wheels are placed as above described. And this placing of the axles may be defined as placing them in upright transverse planes which are between the upright transverse middle plane of the car and the ends of the car. It is also to be observed that an upright, transverse plane between either end of the car and the adjacent wheels, and near said wheels, will cut a part of the sub-axle lading floor or bottom lying below the axle plane. Hence it is appropriate to define these wheels and axles as being grouped between two upright, transverse planes cutting portions of the sub-axle lading floor lying below the axle plane.

The foregoing discussion has included conditions and problems encountered in the construction and operation of mine cars, and has proceeded far enough to assemble parts to constitute a complete car embodying my invention.

Continuation of the discussion will relate further to such conditions and problems and to other forms of structure of parts adapted to be put into a mine car embodying my invention.

*Capacity*

In mining practice, the "out-to-out" dimensions of the mine cars are definitely limited by the conditions existing underground. Hence the principal and fundamental object of any improved mine car is the attaining of the greatest lading capacity practicable for a given set of "out-to-out" dimensions, which, as in railroad work, is absolutely essential to attaining the lowest possible operating costs.

In mining it is rather the vertical and transverse "out-to-out" dimensions that are limited by the underground conditions, although the lengths of the mine cars are also to some degree limited by the working conditions. For the same vertical and transverse out-to-out dimensions my improved traction truck will be seen to give quite a material gain in capacity.

When working thin veins of coal, in order to use cars of any substantial capacity, the common mine cars having plank floors must employ planks made so thin that the cars cannot be made more than say ten feet over all length, in order to avoid the excessive bending or breaking of the bottom planks. However, a twelve foot car is thoroughly practical otherwise, and self evidently my improved traction-truck can be made any length that can be gotten around in the mines. My twelve foot car for thin veins will hold closely twice as much as the old style all wood ten foot car, thus cutting haulage costs into halves while reducing other items of cost quite materially owing to the larger tonnage that can be handled in a given number of hours, sufficient to pay for an entire new mine car equipment in a relatively short time.

Cars that can be made high enough off the rail to admit of thick wood bottoms are now made twelve feet in length, but there are a number of reasons for believing that fifteen foot cars will be found thoroughly practicable as soon as it is demonstrated that their construction can be made such that they will stand the service. A few fifteen foot cars have already been built and are in service. Even with thick wood bottoms my longer car shows proportionately greater gain in capacity.

Further: Traction truck

With the old type all-wood car, the bottom of the bumper is the top of the plank forming the car bottom, which latter rests above the axles, so that the top of the bumper is quite high off the rail. With my traction truck, I get the bottom of the car down as close to the track as is otherwise practicable, my bumper being, therefore, to protect this bottom equally close to the track. Therefore, in order that my truck may work in with other mine car equipment, my bumper should be as high off the rail as the old type bumpers and also as close to the track as my car bottom, thus giving about twice the bumper depth heretofore in use; which, however, is manifestly of itself an advantage, in that it will materially reduce the tendency of the bumpers to slide under or over each other.

Belts

The recess in the side of the I-beam formed by the top and bottom flanges offers a convenient method for reinforcing the front and rear belts.

The simplest form of reinforcing consists in turning back the lower end of the belt, 150—3, (Fig. 15), up until it again meets the outer horizontal portion of the same, to which it may be suitably riveted.

The belt however, may be attached to the inside of the I-beam, (see 150—5, Fig. 16), and then bent upward around the inner edge of the upper flange, and thence back again horizontally. A secondary reinforcing belt 150—6, is preferably riveted to the outside of the I-beam, and then bent outward, at the upper flange, to meet the main belt, to which it is then bent.

The front and rear belts (see 150—7, Fig. 17) may also extend down from the top of the lading holding body wings, to the level of the lower I-beam flange, then be bent horizontally inward to meet the junction of the said lower flange and the web of the I-beam, and then bent upward to rest against the said web, to which they are securely riveted. A secondary end belt, 150—8, may be attached next the angle iron, 6, (see also Fig. 4), which rests against the web of the I-beam, then bent out, up, and down over the upper flange, at say an angle of forty five degrees, until it meets the outer horizontal portion of the front or rear belt as the case may be, to which it is then securely riveted.

The end belts, when attached to the outside face of the I-beam web, have preferably, over the outside of the attached portion, a bracket plate, 156 (see Fig. 15). The belt rivet, 157, passes through the said bracket plate, the said belt, and the said I-beam web. This bracket plate is bent inward, at the rear vertical edge of the belt, (see Fig. 2), until it meets the face of the said web, to which it is again riveted as shown. The middle belts are provided with a similar bracket plate, 156—1.

Variations: Spring bumpers

The spring bumper however, may be provided with a metal spring, 19 (Fig. 9) for the purpose of reinforcing the action of the wood springs, as shown.

This auxiliary spring, 19, can be of various forms and constructions, although in Fig. 9 I show a leaf or semi-elliptic spring backing and parallel to the wood spring, and located behind the central portion thereof. If desired, a spring bearing plate, 20, can be employed equal in width to the wood springs, and resting on the convex center of the said wood springs.

Evidently by reducing the number of the wood springs, room may be left for one or preferably several coil springs, between the wood springs and the forward face of the end channel web. Where metal bumper springs are used, evidently the wood springs may be replaced by a solid wood bumper, somewhat similar to that in Fig. 27 or by a metal or ribbed metal bumper proper.

Solid bumpers

Evidently the space between the bumper face strap, 14, (Fig. 4), and the front vertical face of the end channel, 2, may be filled with a solid wood beam hewed to fit within the space specified, the coil spring shown being omitted. This will give a solid wood center bumper, somewhat similar to the solid wood side bumpers shown in Fig. 27, and next described.

All the bumpers previously described, may be termed center bumpers. What are termed side bumpers are used rather extensively today, but are rapidly being superseded by the center bumpers.

The single draw-bar still in use extensively fits practically level with the top of the bumper, which therefore is necessarily recessed, (see Fig. 27), in order to permit the use of the coupling clevis, 21, (Fig. 31). This construction is what in practice is termed the side bumper arrangement.

The side bumpers shown in Fig. 27, consist of two wooden blocks, 22, fitting between the side bumper sheathing, 23, (Fig. 28), and the front face of the end channel, 2; and these blocks are spaced apart to provide ample clearance between the draw bar and adjacent end faces of said blocks.

The wood side bumpers are preferably held in place by the center bumper bolts, 13—3, and the end bumper bolts, 13—4, and covered with the bumper sheathing plates, 23, which fit between the upper and lower flanges of the end channel. The outer corners of the wooden blocks and their sheathing plates are curved, so as to admit of the cars readily taking the curves. The plates, 23, are held in place by the bolts, 24, inserted after the bumper blocks and sheathing plates are in place and the wood blocks are held in place against lateral thrust, by the outside end bumper plates, 18, and the inside end bumper plates, 18—1, and the draw-bar is riveted to the end channel, 2, by the king rivet, 25.

Even flexible or spring bumpers have a rigid backing in order to take care of the final impact of one car against another, which rigid backing may be built up or braced, preferably, at least in part, by suitable connections with the sheet metal bottoms, which are admirably adapted for that purpose, so as to meet the requirements of any class of service, even the most severe.

The flexible or spring bumpers may consist of vertical wood springs, a combination of wood and metal springs, or of a solid wood bumper in connection with wood or metal springs. A solid wood bumper may, of course, be used with my improved traction truck.

*Variations: Bottom pivoted spring draw-bars*

As will be evident from Fig. 5, a coil spring in line with the vertical center of the bumper will evidently be quite close to the draw bar pivot pin, thus giving the draw-bar a great leverage against it, reducing, for a given draw-bar play, the force of the spring action. In order to increase the force of the spring action, a separate leaf or semi-elliptic draw-bar spring, 42, Fig. 9, may be introduced as high up, as the bumper deflector plate, 9—1, will permit.

A spring bearing plate, 43 (Fig. 13), with the rear lower half sloped to fit extreme rear position of the spring draw-bar, may be introduced between the draw-bar spring, 42, (the same as in Fig. 9) and the upper vertical portion of the lower draw-bar, 30—4, the spring pin, 44, serving to maintain the said bearing plate in position. In order that the said spring may have a straight line action, a link, 45, may be inserted in the slotted lower pivot end of the upper draw-bar, 30—3; a secondary draw-bar pivot pin, 32—1, passing through the forward portion of the said draw-bar link, and through the spring bracket, 46, which latter serves the double purpose of supporting the said draw-bar spring, and also acting as a bumper compression brace; (see also 46—1 Fig. 9). In order to keep the draw-bar from working upward, a draw-bar catch, 47, (Fig. 13) may be riveted to the rear lower vertical portion of the upper draw bar, the lower portion of said catch being extended rearward, as shown, to engage the forward edge of the horizontal plate, 48, riveted to the sheet bottom, 7—4, of the car, of the side dumping type.

The right line action of the draw-bar spring, 42—1, (Fig. 29), may also be assured by means of the line pin, 49, attached to the upper vertical portion of the draw-bar, 30—5, by means of the strap, (see dotted lines 50), the curved portion of said strap resting in a corresponding recess in the spring bearing plate, (see dotted lines, 43—1). The said line pin moving in a horizontal slot in the bumper bracing; the draw-bar pivot pin, 32—2, working in a vertical slot similarly placed, so as to permit the vertical motion necessary to permit the horizontal motion of the said line pin.

*Center pivoted draw-bar*

The center pivoted draw-bar, shown in Fig. 34, is the preferred form of pivoted draw-bar. What may be termed the draw-bar lever arm, is the distance from the coupling pin, (see 36 Fig. 5) to the draw-bar pivot, 32. The draw-bar lever arm, in the case of the center pivoted draw-bar, may be said to be roughly, only about half that of the bottom pivoted draw-bar, while the spring lever arm may be said to be nearly twice as great. It therefore follows with the center pivoted draw-bar, a given size spring will have fully three times the range of action, that it can have with the bottom pivoted draw-bar, for any given amount of motion of the forward (left, as shown in both Figs. 5 and 34) end of the center pivoted draw-bar.

Where the tensile draw-bar strains at right angles to the upper part of the center pivoted draw-bar, the leverage against the coil spring would be say as 3 to 2. Owing, however, to the relatively slight angle between the upper part of the draw-bar, in its highest position, and the horizontal draw-bar tensile strains or "pull", the leverage in favor of the spring, at the first instant, will be say 3 to 1. As the draw-bar is pulled more and more nearly horizontal, the leverage in favor of the draw-bar spring becomes greater and greater; it requiring an almost infinite horizontal pull to bring the center-pivoted draw-bar to a dead level. The center pivoted draw-bar is therefore, for coil springs of usual sizes for the purpose, a cushioned device for almost any pull, that can occur in practice.

With the center pivoted draw-bar, (Fig. 34), the horizontal or nearly horizontal portions of the draw-bars above the half round filler, 33, forming the draw-bar pivot, may be termed the draw-bar proper while the portions of the draw-bar below the said pivot point, may be termed the draw-bar spring lever arm.

As shown, in Fig. 34, the upper and lower bars, 30—6 and 30—7, respectively, are preferably welded together, at their lower ends, the draw-bar pivot block, 52, is preferably welded to the upper forward face of the more nearly vertical portion of the lower draw-bar, 30—7, in such a position as to form, with the bend in the draw-bars, approximately a half circle, to correspond to the half round filler, 33. In order to increase the strength of the bend in the draw-bars, a flat filler, 53, is preferably inserted between the two draw-bars at the bend, having been first bent to conform to the said bend.

The spring arrangement is substantially that shown in Fig. 5, with the bottom pivoted draw bar. The coil springs, 39—1 and 39—2, act against the two circular angle bearing plates, 411—1, held in place by the coil spring pin, 41—1, which passes through a horizontally U-shape bridle, 531, riveted between the bumper braces, and against which bears the rear angle bearing plate. The rear end of the coil spring pin, 41—1, has an annular groove around it, so as to receive the slotted upper U-shaped end of the coil spring pin key, 532, attached by the key bolt, 533, to the said bridle, so as to be readily removable. The forward end of the said coil spring pin is held in place by the conical aperture in the lower end of the draw-bars. With the several parts suitably assembled, it is evidently only necessary to insert the coil spring pin key, 532, and its bolt, 533, in place, when the center pivoted spring draw-bar is ready for operation.

The half round filler, 33, and its base plate, 34—1, (see also Fig. 5), shown as separate parts merely for the purpose of better distinction, are preferably welded together, the said base plate being riveted to the rear vertical face of the end channel; with the reinforced bend of my improved center pivoted draw-bar there should be little occasion to remove the same. It is however, advisable, to leave a slot, 534, in the center of the upper sloping face of the bumper deflector plate, 9—1, suitable to permit the removal of the said draw-bar; this slot being otherwise closed by the removable plate, 535, to prevent the lading falling through.

Swinging draw-bars

The swinging draw bar shown in Fig. 18 has one feature in common with the center pivoted draw bar just described, in that the lower ends of the upper and lower bars, 30—8 and 30—9, are preferably welded together. In case of the swinging draw bar, however, this lower welded (forward as shown) end is forged into a round coil spring spindle, 30—10, which passes through the center of the double coil spring, 30—3.

The swinging draw-bar may also be said to be a pivoted draw-bar, as shown, in that it passes through a hole in the rear U-shape pivot bridle, 551, (Fig. 18), riveted between the vertical sides, 552, of the swinging draw-bar housing shown in section at right angles to the draw-bar coil spring spindle in Fig. 19; the said hole being only as much larger than the said spindle as will permit the slight swinging motion required.

The said coil spring may bear against the said pivot bridle, 551, at its rear upper end, bearing at its lower forward end against the bearing thrust plate, 553, having a circular face plate adapted to receive said coil spring, together with a hollow cylindrical body adapted to receive the draw-bar spring spindle, as shown. The lower forward face of said hollow cylindrical body bears against the face plate, 554, which in turn transmits the spring thrust to the spindle key, 555, which in turn transmits it to the draw-bar spring spindle.

Evidently, the said coil spring will cushion the draw-bar pull. The said hollow cylindrical portion of the bearing thrust plate, is passed through a hole in the forward U-shape bridle, 556, also riveted between the vertical sides, 552, of the swinging draw bar housing; said hole being only enough larger than the outside diameter of said hollow cylindrical portion to admit of the necessary play; said face plate being enough larger than this hole that it may, when resting against the forward bridle, 556, satisfactorily transmit to it, without failure, any tensile draw-bar strains.

The draw-bar housing may consist of two vertical plates, 552 (Figs. 18 and 19) one on either side of the double coil spring, 39—3, and having their lower edges bent outward at right angles, to fit the rear bottom plate, 7—3, and riveted or otherwise suitably attached to the same; the sides of the vertical plates being cut to suitably enclose the said swinging drawbar without unnecessary loss of lading space; the housing cover, 557, being bent to conform to the sides of the vertical plates, 552, to which said cover is suitably attached, as by bolts and nuts.

In order to prevent the sliding motion of the draw-bar gradually cutting into the channel reinforcing strap, 3, the draw-bar roller, 558 (Fig. 18) may be introduced, so placed that the draw-bar comes to a bearing on same, before the draw-bar reaches its extreme rear (as shown) position, (see dotted lines, 30—10), which is the position of greatest downward pressure.

Evidently what has heretofore been termed pivoted draw-bars may also be termed swinging draw-bars, as distinguished from spring draw-bars, heretofore in use, in which the action is strictly right line.

Variations: Rigid draw bars

Fig. 2 shows a rigid draw bar arrangement, as applied to the rear end of an end dump mine car. As applied to the front end of an end dump car, the rigid draw-bar, in addition to reinforcing the upper flange of the end channel against compression, may be utilized to also support the front deflector plate, 9—1, against the thrust of the lading while being dumped.

The construction shown in Fig. 2 may be varied largely. For instance, the preferred construction, as applied to the front end of the car, is illustrated in Fig. 14; the lower bar, 30—14, resting, at its forward end, on the channel reinfrocing strap, 3, is extended horizontally rearward, until it just passes over the bumper deflector plate, 9—1, at which point it is bent downward to conform to the slope of the said deflector plate, and resting thereon, as far as desired, but preferably, for heavy service, extended the full length of said deflector plate, until it reaches the forward bottom plate, 7—1, (Fig. 2) and then again bent and extended over the same sufficiently that it may be securely riveted to the same, as in the case of the rigid draw-bar shown in Fig. 2.

The rear end of the top bar, 30—13, (Fig. 14), rests on the top of the upper sloping portion of the lower bar, leaving the lower bar, however, at the point at which the lower bar turns horizontally forward along the top of the end channel; the said upper bar passing on upward and forward, as shown, until it reaches the height necessary to give the clearance between the forward ends of the two bars, desired for the operation of the coupling device.

In the angle extending downward and rearward from the upper rear corner of the channel reinforcing strap, is placed a similar angle connecting bar, 57—1, at its front face bearing against the rear vertical face of the end channel, the other leg of said angle connecting-bar bearing against the under side of the bumper deflector plate, 9—1, and immediately under the two bars just described.

Evidently then the upper forward portion of the deflector plate, in the center, is held between the bars and the angle connecting bar. Rivets passed through the four parts mentioned, as shown, will bind the same so as to form a workmanlike reinforcing rigid draw-bar. The forward vertical leg of the angle connecting bar should be riveted, as shown, to the vertical rear of the end channel to hold the angle connecting bar rigidly in place under stress.

The construction shown may also be otherwise varied for the purposes indicated.

Center draw bars

With the center draw-bars shown in Figs. 28 and 31, the strength of both the top and bottom flanges of the end channel are utilized to resist the tensile haulage strains, instead of only that of the top flange, in the case of the top draw-bar, which latter involves what is termed in mechanics, eccentric loading, which also tends to rock the parts loose. For a given desired tensile haulage strain, therefore, a lighter weight end channel can be used, as the strains are then straight line instead of eccentric. The center draw bars are however, in a less convenient position for coupling, and can only be used in new mines where all cars are of this type.

The double center draw-bar, as shown in Fig. 28, is preferably made from a flat bar of iron, so bent as to form the upper bar, 30—14, and the lower bar, 30—15, the bend in the same being connected to the center of the vertical web of the end channel, by the rivet, 25.

The center draw-bar may also be a single draw-bar, (see 30—17, Fig. 31), similarly provided with a suitable coil spring spindle, also placed in the vertical center of the end channel.

Automatic couplings

My improved traction truck particularly readily admits of automatic couplings, similar to the Master Car Builders automatic coupling, 58 (Fig. 38), which may have a broad base, 58—1, by means of which it may be riveted to the forward vertical face of the end channel, 2, by means of the rivets, 581.

Variations: rigid axle boxings

This inner reinforcing plate, 61, (Figs. 7 and 8) shown as wrought plate may be replaced by a somewhat similar inside axle boxing, 62, (Fig. 20), with which the axle boxing interlocks, as in the case of the wrought reinforcing plate, 61.

The axle bearing may be bushed in the usual way with say a brass bushing, 63, (see Fig. 20) preferably extending the full length of the axle bearing and fitting, at its outer end, in a suitably prepared recess therefor.

Cutting a hole in the web of the I-beam sufficiently large to admit of the insertion of the inner extension of the axle bearing, as previously explained, necessarily somewhat reduces the strength of the I-beam at this point. This reduction in the strength of the I-beam may be made considerably less without reducing the pin interlocking value of the axle boxing, by omitting the inward extension of the axle boxing and placing the interlocking feature at say the two extreme end axle boxing rivets, 64 and 65 (Fig. 6) thus forming my improved end or bolt interlocking axle boxing. The face plate, 60—4, (Fig. 22), has an inward cylindrical extension, 60—5, surrounding and concentric with said end rivet, 64—1, which therefore may be termed the bolt interlocking extension; the inward cylindrical extension of said face plate passing through holes in both the web of the I-beam and through the inside axle boxing face plate, 62—1, just large enough for that purpose.

The length of said inward cylindrical extension of said plate is made such that the rivet, 64—1, will just bind the several parts together as tightly as may be desired.

The same construction may be employed for the rear end rivet, 65 (Fig. 6). The sum of the double pin shearing values thus obtained may be made actually greater than that obtained by the inward extension of the axle boxing as in Fig. 8, while only necessitating a hole in the web of the I-beam, sufficiently large for the insertion of the axle, 66, (see Fig. 23).

Swinging axle boxings

The flexibility of the old type all-wood car is a distinct advantage, in one respect, in that it permits practically at almost all times, full contact of all four wheels with the track, even in the case of a quite uneven track, a certain amount of which exists in all large mines. With all steel cars as at present constructed, in the case of uneven track, often only three wheels are in contact with the rails, thus resulting in derailment, and consequent loss of time. Again, with all steel cars, the frames sometimes become sufficiently twisted, in wrecks, that on level track only three wheels are in contact with the rail, thus rendering the car unfit for service. The swinging or drop axle boxing has been devised to permit the contact of all four wheels in case of either uneven track or of somewhat twisted trucks.

It has been proposed to accomplish the same purpose by means of vertically elongated axle bearings, semi-circular at the top and bottom, to fit the axle. With this arrangement, when the wheel hits the horns of the dump, the axle practically touches the axle bearing at but one point, and therefore necessarily, in time, will become badly battered and scarred.

In operation, the swinging or drop axle boxing is preferably pivoted at the forward end, the rear end having the amount of vertical play that may be necessary to give the axle, roughly mid-way between, the desired amount of vertical play to maintain contact between the wheels and the rail, under reasonable conditions, thus permitting the axle bearing to fit the axle, as is otherwise desirable.

The swinging axle boxing consists preferably of the combination of substantially what has heretofore been termed the end or bolt interlocking axle boxing, now termed the outside axle boxing, together with a similar inside axle boxing; the inner and outer axle boxings being suitably connected together, to act as a unit, either of which may be interlocked with the other.

Fig. 24 shows an inside view of the inside swinging axle boxing, 62—2, the extreme left rivet, 64—2 (Fig. 24) being the pivot pin or bolt, which is therefore made as large as is otherwise practical, and designated as the king pin or bolt. The extreme right rivet, 65—1, holds together the rear ends of the said inside axle boxing and of the outside axle boxing face plate, 60—6 (see Fig. 26).

Fig. 30 shows the holes in the web of the I-beam designed to give the maximum interlocking shearing value, for a given vertical wheel play, and the corresponding maximum net strength of the I-beam, the axle hole, 80, being between the king bolt hole, 81, on the left, and what may be termed the swinging bolt hole, 82, on the right. The axle hole, 80, may be made as a vertical slot with the upper and lower ends semi-circular, and of a diameter equal to that of the axle, as shown.

The diameter of the king bolt hole, 81, should be equal to the vertical depth of the axle hole 80, see dotted lines 83. This gives the outside diameter of the king bolt interlocking extension 65, (Fig. 22).

The vertical depth of the axle hole 80, (Fig. 30), also controls the vertical depth of the rear axle boxing or swinging bolt hole 82, which should be the same, see dotted lines 83. The horizontal distance of the rear boxing hole 82 from the axle hole 80, as shown in Fig. 30 is the same as the distance of the latter from the king bolt hole 81. Therefore, the vertical play of the rear boxing hole will be twice that of the axle 68. If therefore, we deduct from the diameter of the king bolt hole, twice the vertical axle play, we obtain the outside diameter of the rear interlocking inward extension of the axle boxing around the rear axle boxing rivet 65—1, (Fig. 24), also termed the axle boxing swinging rivet.

With the swinging axle boxing, the upper edge of the axle boxing face plate, as well as the upper edge of the inside axle boxing should rest against the upper flanges of the I-beam, when the swinging axle boxing is in uppermost position (see 60—6 and 62—2, Figs. 24 and 26), there being a space between the lower edges of the swinging axle boxings and the lower I-beam flange equal to at least the maximum vertical play of the axle boxings (see Fig. 26). The dotted lines in Fig. 24 show the swinging axle boxing in its extreme lower position.

In Fig. 30, within the axle hole, 80, the two positions of the axle, 66 (Fig. 25) are shown by the dotted lines, 66—1, the two extreme positions of the rear axle boxing rivet, 65—1, being similarly indicated.

With the swinging axle boxing, more particularly, rivets are to be preferred to bolts and lock nuts, while cast iron is much preferable to cast steel, on account of the readiness with which it may be obtained, as well as on account of the lower cost. A short section of wrought iron pipe, 84 (Fig. 22) may be put around the heated king bolt shank, both of which are then inserted in the king bolt hole. A wrought washer, 85, may then be placed on the king bolt shank, and thus resting on the short section of pipe just mentioned, the length of which may be made such, if the king bolt be now headed in the usual way, on the right as shown, that the cooling strains of the king bolt rivet will be taken up by the said short section of pipe, thus avoiding the danger of cracking the cast iron, and yet the bearing may have any amount of (horizontal as shown) play, that may be desired.

The swinging axle boxing may have at least two other rivets, 86 (Fig. 24) near the top, in order to prevent the upward thrust of the axle from forcing the upper edges of the axle boxing outward from each other, owing to the slight slope of the under sides of the I-beam flanges. These other rivets preferably also have short sections of wrought pipe and wrought washers, as in the case of the king bolt, the holes in the I-beam web therefore being suitably slotted, to allow the necessary vertical play, substantially as shown.

Self evidently, however, in so far as inequalities of track are concerned, only one pair of axle boxings, preferably the rear axle boxings, need be of the swinging or drop type. Even for heavy service, the front axle boxings may be made rigid cast steel axle boxings, and the rear axle boxings, swinging cast iron axle boxings.

Variations: Axle tubes

The axle tube, 100—1, Fig. 21, is not rigidly connected with the axle boxing, (as in Fig. 20), but is maintained in place by means of an annular collar, 102, on either end, bearing against the vertical inner face of the inward extension, 60—7, of the axle bearing. This form of axle tube, which may be termed the loose axle tube, should be bushed (see 63—1, Fig. 21) with an annular bushing similar to that shown in Fig. 20, inserted in either end. The loose axle tube is free to rotate, similar to the loose axle, so that if bushed, the bushed bearing may wear at least somewhat uniformly all around, and it has another advantage in that it admits of a relatively simple form of spring wheel truck.

Axle tube spring truck

One of the material advantages of the swinging axle boxing, is that it readily admits of spring wheel trucks, which will be particularly desirable, with a large mine car containing a considerable tonnage of coal. With bushed loose axle tubes passing through swinging axle boxings, it only becomes necessary to provide a suitable spring action cooperating with the axle tubes, to secure a practicable form of spring wheel truck, which may therefore be termed axle tube spring trucks. The spring operating mechanism is, preferably, placed in the center of the axle tubes, one spring operating mechanism therefore serving to operate equally the wheels on either side of the same.

As shown in Figs. 24, 25 and 26, the bushed loose axle tube, 100—1, operates the swinging axle boxings through which it is passed in either end. Two tube bands or belts, 103, which pass over the axle tube, are made long enough to also pass under the spring lever pin, 104. The leaf or plate spring, 105, shown in Fig. 24, compressed flat, as by the weight of the car and its lading, has, when not compressed, its concave side upwards, the ends of said spring resting on the under side of the sheet metal spring plate, 106 (Fig. 32), the sheet metal spring plate being maintained in place by the angular brackets, 107, between it and the under side of the axle deflector sheet, 9—2.

The under side of said spring, 105, rests on the angular spring bearing plate, 108 (Fig. 24) flat on its upper side to fit the spring, but with the under sides sloping downward toward the center so as to fit in a corresponding recess in the free end of the spring lever, 109.

The two tube bands, 103, are placed on either side of the spring lever, 109, as shown in Fig. 25, the latter being at the center of the bushed loose axle tube, 100—1.

The spring lever, 109 (Fig. 24) has its forward end bent down under the bottom of the forward vertical part of the deflector plate, 9—2, where it is then again bent back up over the rear edge of the forward bottom plate, 7—1, slightly recessed for that purpose. This bent forward end of the spring lever thus becomes the lever pivot, the opposite or free end of the spring lever having a vertical play at least equal to the amount of the spring action. The portion of the spring lever immediately under the axle tube, is swelled sufficiently to permit the spring lever pin, 104, to pass through its center. With the several parts suitably assembled, it evidently then will only be necessary to insert the spring lever pin, 104, in the two tube belts, 103, and in its hole in the spring lever, 109, the cotter pin, 110, then serving to maintain the several parts in their working positions.

The spring, 105, when released from its compressed position shown in Fig. 24, as by the wheels passing over an abrupt drop in the track, will force downward the free (right as shown) end of the spring lever, thus also carrying downward the lever pin, 104. Owing to the action of the axle tube bands, 103, the loose axle tube, 100—1, and its contained axle, 66, are also coincidentally forced downward, the positions of the several parts being shown by the several dotted lines in Fig. 24.

Swinging tube spring truck

The swinging tube spring truck shown in Fig. 32, which does not require axle tubes, is materially simpler than the axle tube spring truck, which latter nevertheless is evidently also a swinging spring wheel truck. The essential point of difference between the axle tube spring truck, and the swinging tube spring truck proper, shown in Fig. 32, is that in the latter the swinging axle boxing is operated, not by the axle tube, but preferably by a bent special swinging tube, as stronger and lighter, which however may be replaced by a bar or other equivalent device.

The swinging tube, 120 (Fig. 32) is preferably placed immediately under the center of the spring, 105, of the same construction as the corresponding spring of Fig. 24, and bearing up against the same kind of sheet metal bearing plate, 106, maintained in place by the angular brackets, 107. A suitable spring bearing block, 121, is placed at the center of the spring, 105, the said bearing block being flat on its upper side and concave longitudinally on its under side, to conform to the curvature of said swinging tube.

The swinging tube, 120 (Fig. 32), at either end, is passed through the vertical face plates, 60—8 and 62—3, respectively, of outer and inner axle boxings, but not rigidly connected to the same. Said swinging tube may have an annular collar, 122, on either end, next to the face plates of the inner axle boxings, to maintain said swinging tube in the desired position. With the several parts suitably assembled, evidently the insertion of the spring bearing block will hold the several parts in the working position.

Fig. 36 shows an axle boxing, 60—8, in part specially designed for the swinging tube spring truck and in part designed to obviate the use of the secondary axle boxing rivets, 86, (Fig. 24) thus avoiding the holes in the I-beam necessitated thereby, see Fig. 30.

As shown in Figs. 32 and 36, the outside axle boxing, 60—8, has a vertical rib, 60—9, immediately over the axle bearing proper, which transmits the upward thrust of the axle to the upper flange of the I-beam above, or still better to that portion of the I-beam bridle, 138, which extends back under said upper I-beam flange, and which is planed off so as to give a horizontal bearing to said vertical rib, 60—9, said bridle extension being also riveted in place, as shown.

In order to give the greatest leverage possible for the swinging tube, 120 (Fig. 32), it is preferably placed at the extreme end of the axle boxing opposite the king bolt pivot, 64—2. The swinging rivet, 65—1, may thus be placed between the axle and said swinging tube, 120, substantially as shown in Fig. 36, and thus giving the maximum strength of the several parts, for a given reduction of the strength of the I-beam, 1.

The lower head of the rivet, 701 (Fig. 32), in conjunction with the similarly recessed upper face of the vertical rib, 60—9 (Figs. 32 and 36), of the outside axle boxing will evidently serve admirably to hold said vertical rib in the desired position, when the same bears against the under side of the turned under tapered end of the I-beam bridle, 138—2.

The outside axle boxing may be provided with the usual oiling hole, 67, (Fig. 36) as previously explained. The face of the inside axle boxing, 62—4, may have an oiling interlocking extension into the outside axle boxing which will evidently serve admirably to hold the vertical rib in the desired position, when the same bears against the under side of the turned under tapered end of the I-beam bridle, 138—2.

In addition to the usual oiling hole, 67, above referred to, the said oiling interlocking extension may also be provided with its own special oiling hole, 67—1 (Fig. 36) and suitably connected with the axle bearing, but on the inside of the I-beam, 1, (see Fig. 2).

The rear end of the outside axle boxing, 60—8 (Fig. 36) may be an arc of a circle swung from the king rivet, 64—2, and conforming to the forward face of the axle boxing stop block, 123, riveted to the web of the I-beam so as to permit the swinging action of the axle boxing, and yet also to take the dumping shock off the king rivet, in part or in whole, as desired. The curved forward face of said stop block is sufficiently re-entrant to keep the axle boxing face against the vertical web of the I-beam.

Variations: Axle deflector supports

In the case of the swinging axle boxing, the crown of the arch of the axle deflector plate will be unsupported by the inner axle bearing, at such times that the wheels do not happen to be in their extreme upper position. With swinging axle boxings, the I-beam bridle, 138 (Fig. 10) previously described, will serve the purpose, particularly if the I-beam angle brace is also used.

Wheel brakes

A number of otherwise good wheel brakes are practically undesirable since, owing to their location incident to their design, they are quickly rendered unserviceable by being broken or bent through contact with mine obstructions. The recessed wings of my improved lading holding body offer a most secure place for the wheel brakes and hence may be cited as one of the advantages thereof. The upper outside angle of the I-beam between the upper part of the web, and the upper flange offers a most secure recess for a rolling side brake rod, where it is safe against almost any kind of injury.

The wooden brake block, 170, shown in the dotted lines (Figs. 2, 3 and 15) and the rolling side rod (see dotted lines 171, Fig. 15) and its bracket, 172 (see dotted lines, also Fig. 33) are old, with three exceptions. The said rolling side rod has heretofore been placed in a position corresponding to the inner top bend of the middle belt, 150—1 (Fig. 3) so that the forward brake block rod fulcrum, 171 (Fig. 15) comes on top of said wooden brake block instead of below the said brake block, as in my improved brake rigging, and as shown in Fig. 15, which is due to the relatively low position of the I-beam.

With my improved brake rigging, room is preferably left between the rear belt, 150—2 (see Fig. 33) and the rear end channel, 2, for the upward extension, 171—2, of the brake lever fulcrum rod, 171. The rear end of the brake lever fulcrum rod is held in place by the rear fulcrum bracket, 172—1, riveted on the outside of the rear belt bracket plate, 156—2.

With my improved brake rigging, the forward or brake block fulcrum, is below the brake block, while the rear rolling rod fulcrum extends upward, instead of downward, as heretofore; while owing to the position of the rolling side rod, it may be termed a concealed rolling side brake rod.

Narrow gauge traction trucks

A number of the older coal mines have gauges as narrow as 3'—0", while in metal ore mines gauges as narrow as 2'—0" are not uncommon. In such cases, the longitudinal supporting side sills may, to advantage, be placed on the outside of the car wheels (see Fig. 37) the axle boxings, 60—9, being, say, of the single rigid type, and on the inside of the I-beams, but may be double, drop or swinging axle boxings, the axle, 66, extending through the I-beams and being held in place by the cotter pins, 180.

The wheel hoods, 181, as shown in Fig. 37, designed for side dumping car, are semi-circular, longitudinally, above the axles so as to cover the wheels with reasonable clearance, but with sides vertical below the wheel axle, so as to permit the placing of the wheels in the working position, after which the axle is next placed in position, when the cotter pins are next inserted, the truck being then ready for operation.

Transversely, that is, in the direction parallel to the axles, the wheel hoods are preferably, where cradle dump is used, at least approximately rectangular in cross section. The outer vertical faces of the wheel hoods may conveniently rest on the upper flanges of the I-beams, while the inner lower edges of the inner faces of the axle hoods, are preferably also turned horizontally inward, in part so as to give the said lower edges a good bearing on the wheel hood supports, 182, which as shown, are two flat bars of iron, resting on the lower flanges of the I-beams, and as close on either side of the wheels as will permit the ready insertion and removal of the wheels. In case of the cradle dump car, the wheel hood supports may be made say of angle irons, instead of flat bars.

The inner vertical faces of the wheel hoods, will evidently make a sort of a bridge truss between said wheel hood supports, and to which the axle hoods, 10—3, may be suitably attached.

Therefore, the longitudinal supporting side sills of my improved traction truck may be either inside or outside the wheels.

Even for the end dump cars, the bottoms, and the deflector plates as well, may also be braced by say tees, (see 183 Fig. 37), parallel to the longitudinal side sills, as these do not involve any appreciable loss of lading space. The wheels, 184, are shown in working position within the wheel casings, 181, being retained the proper gauge outwardly, by means of the loose axle tube (see dotted lines 100—2) the said loose axle tube being cut the desired length to bear against the inner wheel hubs.

Cradle dump cars

The lower end of the secondary axle belt, 150—6 (Fig. 16) may be extended outward sufficiently to engage an upright belt catch, 190, placed beside the track, just as close as will clear the wheels, so as to hold the car on the cradle dump, while the car is being emptied of its lading, the said outward extension of the secondary axle belt, 150—6, being therefore termed the cradle dump catch.

Preferred construction

A very large percentage of the coal produced in the United States is delivered from the mines in cars that are dumped by tilting the car endwise by means of what is called the horn dump. A small percentage of the coal produced is delivered from the mines in cars that are dumped by turning the car over sideways by means of what is now termed the cradle dump. My preferred construction, therefore, is necessarily based on the end dump type, as the more generally useful construction.

For somewhat similar reason, my preferred construction is also based on that particular type of my improved traction truck which will admit of a few of my cars being added from time to time, as new mine car equipment is needed, to the extensive mine car equipment now in general use throughout the country, the essential feature of which latter may be said to be the placing of the draw-bar over the bumper, which, therefore, may be termed the top draw-bar.

The draw-bars now in common use (practically all top draw-bars) may be classed as either single or double. With the single draw-bar, two clevises, one for either car, connected usually by three links, are used. With the double draw-bar a single link is used to connect the opposite cars. The double draw-bar has been selected for the purpose of illustration, but either may be used as preferred.

The placing of the draw-bar in horizontal line with the vertical center of the bumper, which therefore may be termed the center draw-bar, admits of the simplest possible construction of my improved traction truck and therefore also represents the minimum cost. The top draw-bar, however, in spite of the mechanical complications its use involves, is in a much more convenient position for coupling, and makes my equipment readily interchangeable with practically all equipment now in use.

Again, in much the same way, the cradle dump is theoretically the preferable construction, although owing to the relatively small number of cradle dumps in use, due in part to high cost of the same, my cars will usually be built of the end dump type.

A very large proportion of the draw-bars in use on mine cars are rigidly attached to the cars. My improved traction truck, however, readily admits of spring draft gear, the preferred construction being provided with spring draft gear at one end, and rigid draw-bar at the other end of the car, as economical and yet ample for the general run of mine work.

All mine car bumpers heretofore in use, so far as I know, may be called rigid bumpers. My improved truck also readily admits of spring bumpers, which, like the spring draft gear, are clearly preferable, for reasons that are too well understood to require statement in detail.

Again, it has not heretofore been found practical, so far as I know, to provide mine cars with spring wheel trucks, but my improved traction truck readily admits of the same, thus placing my improved traction truck generally on an equality with modern railway equipment, while also possessing a number of advantages from a mining standpoint, as herein pointed out.

Haulage strains

What may, for convenience, be termed the tensile haulage strain is that which results from say an electric motor hauling a trip of cars up a steep grade. What may be termed the compressive haulage strain is that which results from the motor holding back a trip of cars on a heavy down grade. The diagonal haulage strains result for instance from the trips of cars passing around curves in the track, and may be either compressive or tensile.

I claim as my invention,

1. In a mine car, wheel axles, sill plates having bottom flanges thereon below the wheel axles, a floor supported by said sill flanges, and axle housings mounted on said floor and connected to said sills, said housings having a gradual slope on one side thereof.

2. In a mine or similar rail car, the combination of side beams, car axles above the lower portions of the side beams, an end structure including an end channel, a bumper member and a filler member between said end channel and said bumper member, and a stationary sub-axle lading bottom.

3. In a mine or similar rail car, the combination of side beams, car axles above the lower portions of the side beams, an end structure including a bumper member having an upright front face and flanges directed toward the car frame, and a stationary sub-axle lading bottom.

4. In a mine or similar rail car, the combination of side beams, car axles above the lower portions of the side beams, a lading holding body including wing floors, said wing floors including parts inclined longitudinally of the car, and a stationary sub-axle lading bottom between the side beams.

5. In a mine or similar rail car which is to be bodily shifted to dumping position for emptying, the combination of side beams, car axles above the lower portions of the side beams, and a lading-holding body including wing floors which intersect the longitudinal upright planes of the wheels below the tops of the wheels and a stationary sub-axle lading bottom extending between the lower portions of the side beams, said body providing a substantially unobstructed lading space above said floors and bottom from which the lading may be discharged by shifting the car to emptying position.

6. In a mine or similar rail car, the combination of side beams, car axles above the lower portions of the side beams, wheels on said axles and located outside the side beams, and a lading body including wheel-recessed lateral body members and a stationary sub-axle lading bottom extending between and secured to the side beams, the wheel recesses of the body members have openings at least at one side of the car of size sufficient to permit access to and axial removal of the corresponding wheel from its axle.

7. In a mine or similar rail car which is to be bodily shifted to dumping position for emptying, the combination of side beams, car axles above the lower portions of the side beams, and a lading holding body including wheel-recessed horizontal wing floors and a stationary sub-axle lading bottom extending between and secured to the side beams, said body providing a substantially unobstructed lading space above said wing floors and bottom from which the lading may be discharged by shifting the car to emptying position.

8. In a mine or similar rail car, the combination of side beams, car axles above the lower portions of the side beams, wing floors extending laterally from the side beams, a stationary sub-axle lading bottom between the side beams, said floors and bottom being rigidly secured to said side beams whereby to support the same and brace said side beams, and continuous lading-containing walls extending upwardly from the lateral edges of the wing floors.

9. In a mine or similar rail car, the combination of side beams, car axles above the lower portions of the side beams, a rear end structure, a front end structure, and a stationary sub-axle lading bottom extending from end structure to end structure and comprising axle deflector plates and an end structure deflector plate and a low horizontal bottom portion between the rear structure and the rear axle deflector plate and another low horizontal bottom portion between the two axle deflector plates and a third low bottom portion between the forward axle deflector plate and the forward end structure deflector plate, the several parts of the bottom being joined to one another, and the forward end structure deflector plate rising obliquely to the height of said end structure.

10. In a mine or similar rail car, the combination of side beams, car axles above the lower portions of the side beams, an end channel, and a stationary sub-axle lading bottom comprising a deflector plate rising on a relatively flat upward slope to meet the upper part of said end channel.

11. In a mine or similar rail car, the combination of side beams, car axles above the lower portions of the side beams, an end channel, and a stationary sub-axle lading bottom including a deflector rising on an upward slope to and over the upper flanges of said end channel and secured to said channel.

12. In a mine or similar rail car, the combination of side beams, car axles above the lower portions of the side beams, an end channel, and a stationary sub-axle lading bottom comprising a deflector extending approximately from side beam to side beam and rising on an upward slope to meet said end channel and secured to said end channel.

13. In a mine or similar rail car, the combination of side beams, car axles above the lower portions of the side beams, end structures each including a channel, and a stationary plate metal sub-axle lading bottom comprising a deflector rising from the lading bottom on an upward slope to meet the upper part of one end structure and secured to said end structure.

14. In a mine or similar rail car, the combination of side beams, car axles above the lower portions of the side beams, a channel-form end structure, and a stationary plate metal sub-axle lading bottom including an end structure deflector rising to said end structure.

15. In a mine or similar rail car, the combination of side beams, car axles above the lower portions of the side beams, a middle supported end structure, a middle end thrust member including approximately parallel sheet metal plates, and a stationary sub-axle lading bottom.

16. In a mine or similar rail car, the combination of longitudinal flanged metal beams, car axles above the lower flanges of the longitudinal beams, and a stationary sub-axle lading bottom secured to the under side of the lower flanges of the longitudinal beams.

17. In a railway car, the combination with side sills, of a plate metal bottom extended outward, in the direction of the length of the car, beyond the ends of said sills and in a plane different from the plane of the bottom, and another member combined with the extended part of the bottom to form a frame end structure, said extension reaching beyond its junction with the other member.

18. In a railway car, the combination with side sills, of a plate metal bottom at approximately the level of the lower parts of said sills and extended outward, in the direction of the length of the car, beyond the ends of said sills and in a plane different from the plane of the bottom, and another member combined with the extended part of the bottom to form a frame end structure, said extension reaching beyond its junction with the other member.

19. In a railway car, the combination with side sills, of a plate metal bottom at approximately the level of the lower parts of said sills and extended outward and upward in the direction of the length of the car, beyond the ends of said sills, another member combined with the extended part of the bottom to form a frame end structure, said extension reaching beyond its junction with the other member, and corner pieces connecting the end structure to the side sills.

20. In a railway car, the combination with side sills, of a plate metal bottom at approximately the level of the lower parts of said sills and extended upward and outward, in the direction of the length of the car, beyond the ends of said sills, and another member combined with the extended part of the bottom to form a frame end structure, said extension constituting a drawbar element.

21. In a mine or similar rail car, the combination of longitudinal flanged metal beams including continuous lower flanges under the car axles, car axles, and a stationary metal plate sub-axle lading bottom extending between and rigidly secured to said flanges.

22. In a mine or similar rail car, the combination of car axles, flanged metal longitudinal beams including continuous lower flanges under the car axles, and a continuous stationary metal plate sub-axle lading bottom extending between and rigidly secured to said flanges.

23. In a mine or similar car, the combination of longitudinal beams, car axles above the lower portions of the longitudinal beams, and a stationary plate metal sub-axle lading bottom secured to the lower portions of the longitudinal beams and operative for bracing the same.

24. In a mine or similar rail car which is to be bodily shifted for dumping, the combination of side beams, end beams secured to the side beams, car axles above the lower portions of the side beams, a continuous stationary metal plate sub-axle lading bottom extending from side beam to side beam and secured to said side beams and secured to one of the end beams and operative for bracing the said beams, and side walls sealed with said bottom for providing a substantially unobstructed lading space from which the lading may be discharged by shifting the car to emptying position.

25. In a mine or similar car, the combination of side beams, car axles above the lower portions of the side beams, end structures, and a stationary integral metal plate sub-axle lading bottom extending from side beam to side beam and from end structure to end structure and secured to the side beams and to one of the end structures.

26. In a mine or similar rail car, the combination of a traction truck consisting of axles and wheels on the axles and longitudinal side members, axle tubes surrounding the axles, and means rotatably supporting said tubes.

27. In a mine or similar rail car, the combination of a traction truck consisting of axles and wheels on the axles and longitudinal side members, axle boxings on said side members, axle tubes resting loosely and turnably in said boxings, and bushings seated in said tubes and surrounding the axles.

28. In a mine or similar rail car, the combination of a traction truck consisting of axles and wheels on the axles and longitudinal side members, axle boxings on said side members, and axle tubes surrounding the axles and resting loosely and turnably in said boxings and having an external member bearing loosely against the inner ends of said boxings.

29. In a mine or similar rail car, the combination of a traction truck consisting of longitudinal side members having lower flanges and axles above said flanges and wheels on the axles, a middle floor supported by said flanges below said axles, and wheel-hooded wing floors having parts lying in planes cutting the upper parts of the wheels.

30. In a mine or similar rail car, the combination of side members, car axles supporting the side members, a stationary sub-axle lading floor, axle deflectors, and a reinforcing member placed above said deflectors.

31. In a mine or similar rail car, the combination of side members, car axles supporting the side members, a stationary sub-axle lading floor, tubular axle deflectors, and a reinforcing member associated with said deflectors.

32. In an end dump mine or similar rail car, the combination of side members, car axles supporting the side members, a stationary sub-axle lading floor secured to the side members in bracing relationship therewith, axle deflectors for guiding the lading over said axles, and means for securing the axle deflectors to said floor and to the side members for supporting and bracing the same.

33. In a mine or similar rail car, the combination of side members, car axles supporting the side members, a stationary sub-axle lading floor, axle deflectors, and angle plates secured to the axle deflectors and the adjacent sides of the side members.

34. In a mine or similar rail car, the combination of side sills, car axles supporting the side sills, a stationary sub-axle lading floor, and axle deflector structures extending over the axles and above the upper parts of the sills and engaged with said parts.

35. In a mine or similar rail car, the combination of side sills, car axles supporting the side sills, a stationary sub-axle lading floor, and axle deflector structures placed above the axles and lying against and secured to the upright faces of the sills and extending above the upper parts of the sills and engaged with said parts.

36. In a mine or similar rail car, the combination of side sill-members, wheels, car axles whose journal centers lie in a horizontal plane above the lower portions of the side sill-members, an end structure including an end channel, a bumper member and a filler member between said end channel and said bumper member, and a stationary subaxle lading bottom.

37. In a mine or similar rail car, the combination of side load-supporting sill-members, wheels, wing-type lading bottoms lying in planes cutting the adjacent wheels, car axles whose journal centers lie in a horizontal plane cutting the side sill-members, an end structure including a metal bumper member of approximately channel shape, and a stationary lading bottom the lower surfaces of which at least in substantial part lie below the plane of the tops of the journals of the car axles.

38. In a mine or similar rail car, the combination of stiff and substantially straight load-supporting side sill-members, wheels, car axles whose journal centers lie in a horizontal plane which is above the lower portions of the side sill-members, end traction haulage sill structures with metal bumper faces, the said end sill structures and the side sill-members forming together a stiff and substantially rectangular traction truck frame, a lading holding body including lading wing floors, said wing floors including portions lying in planes cutting the tops of the adjacent wheels, and a stationary lading bottom between the side sill-members which lies at least in substantial part below the horizontal plane of the tops of the journals of the axles.

39. In a mine or similar rail car, the combination of wheels, car axles having journals, transverse end structures including metal bumper faces, longitudinal load-supporting side sill-members in rigid relationship with the end structures and forming therewith a substantial rectangular traction truck frame, the horizontal plane of the tops of the axle journals intersecting said side sill-members, a lading body including wheel-recessed lateral body members, and a stationary lading bottom between the side sill-members which at least in substantial part lies below the horizontal plane of the tops of the axle journals.

40. In a mine or similar rail car, the combination of wheels, car axles having journals, transverse end structures including metal bumper faces, longitudinal load-supporting side sill-members in rigid relationship with the end structures and forming therewith a substantial rectangular traction truck frame, the plane of the axle journals intersecting said side sill-members a lading body including wheel-recessed horizontal wing floors, and a stationary lading bottom between the side sill-members which at least in substantial part lies below the horizontal plane of the tops of the axle journals.

41. In a mine or similar rail car, the combination with side sill-members and a sub-axle plate metal lading bottom, of a frame end structure in rigid relationship with the side sill-members and formed in part of an extension of the bottom and another member joined to said extension, the extension reaching outward beyond its junction with said other member.

42. In a mine or similar rail car, the combination with side sill-members, of a plate metal lading bottom extending beyond the ends of the side sill-members in the length of the car, another member combined with the extended part of the bottom to form an end structure, said extension forming a draw-bar element, and car axles having journals, said lading bottom including a central section which at least in substantial part lies below the horizontal plane of the tops of the axle journals.

43. In a mine or similar rail car, the combination with side sill-members, of car axles having journals, a plate metal lading bottom having an end extension in the direction of the length of the car, another member joined to the said extension to form a frame end structure, said extension beyond the junction with the other member and forming a draw-bar element, and wheels, a central section of the lading bottom having portions of its lower surface below the horizontal plane of the centers of the axle journals.

44. In a mine or similar rail car, the combination with side sill-members, of a stationary sub-axle plate metal lading bottom having an end extension, a frame end structure formed in part of said extension and including a member joined to said extension, the extension extending lengthwise of the car beyond the junction with said member, and corner pieces for joining the end structure to the side sill-members.

45. In a mine or similar rail car, the combination with side sill-members, of a sub-axle plate metal lading bottom having an extension beyond the ends of the side sills in the direction of the length of the car, and a member located below and connected with the said extension to form a frame end structure, said extension projecting lengthwise of the car beyond its junction with said member.

46. In a mine or similar rail car, the combination with side sill-members, of a sub-axle plate metal lading bottom having an extension beyond the ends of said sills in the direction of the length of the car and located in a plane different from the plane of the bottom, and a member connected with the said extension to form a frame end structure, said extension extending lengthwise of the car beyond its junction with the other member.

47. In a mine or similar rail car, the combination with side sill-members, of a sub-axle plate metal lading bottom located substantially at the level of the lower parts of said sill-members and including an extension beyond the ends of said sill-members in the direction of the length of the car, and a member located below and connected with said extension to form a frame end structure, said extension extending beyond its junction with said member.

48. In a mine or similar rail car, the combination with side sill-members, of a sub-axle plate metal bottom including an extension beyond the ends of said sill-members, and a plate member secured fixedly to said extension and spaced from the end edge of said extension to form a frame end structure.

49. In a mine or similar rail car, the combination with end bumpers, of side sill-members, and a sub-axle plate metal bottom including an extension beyond the ends of the sill-members in the direction of the length of the car, said extension forming a bumper support.

50. In a mine or similar rail car, the combination with side sill-members, of a sub-axle plate metal bottom having an extension beyond the ends of the sills in the direction of the length of the car and forming a draft member, and another draft member adjacent said extension.

51. In an end-dump mine or similar rail car, the combination of load-supporting longitudinal side members, wheels, axles, bumper and coupling means at the ends of the car, a plate metal central bottom located in substantial part below the horizontal plane of the tops of said axles and sloping upwardly at one end toward the adjacent bumper and coupling means whereby to deflect the lading over said means during end dumping, wing bottoms extending laterally from said central bottom and intersecting the upright longitudinal planes of the wheel flanges below the tops of the wheels, and wheel coverings rigid with the wing bottoms and extending over the wheels.

52. In a mine or similar rail car, the combination of side sill-members, wheels, car axles whose journals lie in a horizontal plane intersecting the side sill-members, end structures including bumpers, and a stationary metal plate sub-axle lading bottom securely fastened to the side sill-members and bracing them against endwise movements relative to each other.

53. In a mine or similar rail car, the combination of side members, a lading body, car wheels, car wheel axles having journals whose centers lie in a horizontal plane cutting the side members, and a stationary metal plate sub-axle lading bottom fastened securely to the side members and serving as a bracing means to prevent longitudinal movements of the side members relative to each other, the wheels and axles being grouped between transverse upright planes cutting parts of the sub-axle lading bottom lying below the plane of the tops of the axle journals, together with metal faced bumper means extending past the ends of the lading body.

54. In an end-dump mine or similar rail car, the combination of wheel axles having journals, metal sill-members having bottom flanges thereon below the horizontal plane of the tops of the axle journals, and a plate metal floor securely fastened to the flanges of the sill-members and including axle housings mounted on said floor and between said sill-members, said housings each having a gradual slope in at least one direction from the transverse upright plane of the corresponding axle whereby to deflect the lading over the axle during end dumping.

55. In a mine or similar rail car, the combination of car axles having journals, load-supporting side sill-members extending above and below the horizontal plane of the centers of the axle journals, and a rectangular stationary plate metal sub-axle lading bottom rigidly secured to the side sill-members and located substantially in the plane of the lower edges of said sill-members whereby the said members are reinforced against lateral movements relative to each other.

56. In an end-dump mine or similar rail car, an end structure and a rigidly secured plate metal stationary sub-axle lading floor structure including an end rising at a slope to the end structure for the discharge of the lading over the end structure when the car is tilted forward for end dumping.

57. In a mine or similar rail car with a wing-type lading body which is to be bodily shifted to dumping position for emptying, the combination of longitudinal load-supporting side members, car axles whose journals lie in a horizontal plane intersecting the longitudinal side members, a stationary plate metal sub-axle lading bottom securely fastened to the side members and operative for bracing the same, wing-type lading bottom and wall structures extending from the lateral edges of said bottom and providing therewith a substantially unobstructed lading space from which the lading may be discharged by shifting the car to emptying position, an end thrust resisting member connected with said side members, and a metal face bumper member extending beyond the lading body of the car.

58. In a mine or similar rail car, the combination of side sill-members, car wheel axles having journals whose centers lie in a horizontal plane intersecting the side sill-members, a stationary and approximately horizontal plate metal sub-axle lading bottom rigidly secured to the sill-members and operative for bracing the same, and an end structure including bumper and coupling means.

59. In an end-dump mine or similar rail car, wheels, car axles having journals, an end sill, an end door, and a rigidly secured plate metal stationary lading bottom structure having at least substantial portions below the horizontal plane of the tops of the axle journals, and including an inclined end portion at said end sill whereby the lading may be guided over the end sill when the car is in the end-dumping position.

60. In an end-dump mine or similar rail car, the combination of wheels and car axles having journals, an end structure, a plate metal stationary rigidly secured lading bottom having at least substantial portions below the horizontal plane of the tops of the axle journals and rising by gradual slope to the height of the end structure.

61. In a mine or similar rail car, the combination of a traction truck comprising wheels and axles having journals and load-supporting longitudinal side members located between the wheels and extending above and below the horizontal plane of the centers of the axle journals, transverse members joining the side members, and a stationary plate metal sub-axle lading bottom rigidly secured to the end members below the plane of the axles, the wheels and axle journals being grouped between upright transverse planes cutting parts of the lading bottom located below the horizontal plane of the centers of the axle journals, lading-retaining walls supported by the traction truck, and bumper means at the ends of the car extending above and below the horizontal plane of the centers of the axle journals.

62. In a mine or similar rail car, the combination of a frame including straight side sill-members and end structures including a bumper member, together with car axle journals whose centers lie in a horizontal plane above the lower portions of the side sill-members and also above the lower portions of the end structures, and a continuous stationary plate metal sub-axle lading bottom rigidly secured to the side sill-members and to at least one end structure below the plane of the axles and operative for bracing said frame.

63. In a mine or similar rail car, the combination of longitudinal side sills having upright sections, car axles extending through the upright sections of the side sills through apertures which are so shaped as to permit vertical movement of the axles relative to the side sills, a central sub-axle lading bottom, car wheels, and side lading bottoms located in planes that intersect the adjacent car wheels.

64. In a mine or similar rail car, the combination of straight longitudinal load-supporting side members intersecting the horizontal plane of the centers of the journals of the car axles, wheels, axle boxings between the wheels, car axles in said boxings, axle coverings extending over said axles and connected to the said axle boxings and a stationary sub-axle lading bottom secured to and in bracing relationship with said side members.

65. In a mine or similar rail car, the combination of car axle journals, longitudinal load-supporting side sills with substantially straight and upright lower sections intersecting the horizontal plane of the centers of the axle journals, car wheels outside the said upright lower sections, a stationary sub-axle lading bottom extending from side sill to side sill, and wing lading bottoms extending outwardly from the side sills in substantially horizontal planes.

66. In a mine or similar rail car, the combination of car axle journals, longitudinal load-supporting side sills with substantially straight and upright lower sections intersecting the horizontal plane of the centers of the axle journals, car wheels outside the said upright lower sections, a stationary sub-axle lading bottom extending from side sill to side sill, wing lading bottoms extending outwardly from approximately the bottom levels of the side sills in approximately horizontal planes.

67. In a mine or similar rail car with straight load-supporting longitudinal members, the combination of wheels and car axles having journals having their centers located in a horizontal plane cutting the longitudinal members, wing floors, a stationary secured sub-axle central floor, and wheel hood-coverings extending above the wing floors.

68. In a mine or similar rail car, the combination of an end structure including bumper and coupling means, a central sub-axle lading bottom secured to said end structure, and lading wing bottoms located below the tops of the wheels and lading-containing side walls.

69. In a mine or similar rail car which is to be bodily shifted to dumping position for emptying, the combination of wheels and axles, side lading-containing walls extending above and below the plane of the axles, an end structure including bumper and coupling means, a central sub-axle lading bottom, lading wing bottoms intersecting the longitudinal planes of the wheels below the tops of the wheels and apertured to receive the wheels, and wheel hood-coverings having upright longitudinal closure walls both outside and inside the adjacent wheels, said walls providing a substantially unobstructed lading space from which the lading may be discharged by bodily shifting the car.

70. In an end-dump mine or similar rail car, car wheels and car axles having journals, a lading floor located at least in substantial part below the horizontal plane of the tops of the journals of the car axles and extending laterally beyond the wheels and below a horizontal plane cutting the tops of the wheels, wheel hood-coverings having a gradual slope at the part toward the rear of the car whereby when the car is tilted forward for end dumping the lading rearward of the hood-coverings may slide by gravity over said hood-coverings.

71. In a mine or similar rail car, the combination of load-supporting side sill-members, car axles having journals whose centers lie in a horizontal plane cutting the side sill-members, a secured stationary metal sub-axle floor extending substantially horizontally between the side sill-members and transverse members located above the floor and joined to the side sill-members and floor.

72. In a mine or similar rail car which is to be bodily shifted to dumping position for emptying, the combination of car axles having journals, flanged car wheels, bumper and coupling means, and a stationary sub-axle lading bottom including a portion between the longitudinal upright planes of the inside faces of the flanges of the car wheels, other lading bottom portions which are outside these upright planes and are located below the tops of the car wheels, and still other lading bottom parts outside the said upright planes which rise to a greater height than the top of the car wheel flanges, said bottom portions and parts providing a substantially unobstructed lading space from which the lading may be discharged by shifting the car to emptying position.

73. In a mine or similar rail car, the combination of load-supporting side members and end members, car axles supporting the side members, wheels supporting the axles, a stationary secured sub-axle lading bottom, and bracing and supporting means for said end members located between and parallel to the side members.

74. In a mine or similar rail car, the combination of car axles having journals, longitudinal load-supporting side members extending above and below the horizontal plane of the centers of the journals, end members, a stationary secured sub-axle lading bottom and bracing means for the end members located between and parallel to the side members and located on top of the sub-axle lading bottom.

75. In a mine or similar rail car, the combination of load-supporting side members and end members, car axles supporting the side members and having journals, wheels supporting the axles, a secured stationary lading bottom having at least substantial parts below the horizontal plane of the centers of the journals of the axles, and bracing and supporting means for said end members located between and parallel to the side members.

76. In a mine or similar rail car, the combination of load-supporting side members and end members, car axles supporting the side members, wheels supporting the axles, a secured stationary lading bottom having at least substantial parts below the horizontal plane of the centers of the journals of the axles, and flanged bracing and supporting means for the end members between and parallel to the side members.

77. In a mine or similar rail car, the combination of longitudinal load-supporting side members, end sill traction members each including bumper and coupling means, wheels, axle boxings between the wheels, axles in said boxings, axle coverings extending over said axles and connected to said axle boxings, a sub-axle lading bottom extending longitudinally along the center of the lading body from one end sill traction member to the other, and side lading bottoms having parts located in planes that intersect the adjacent car wheels.

78. In a mine or similar rail car which is to be bodily shifted to dumping position for emptying, the combination of a substantially rectangular traction truck frame, a car wheel and axle connected to said frame and including an axle journal, and a lading body supported by said frame and including a floor portion extending laterally past said wheel at a point longitudinally spaced from said wheel and below the top of the axle journal, a wheel hood-covering extending over said wheel and sealed to said portion, and a substantially vertical side lading wall extending upwardly from the lateral edge of said portion, the space within said lading body being substantially unobstructed whereby the lading may be discharged therefrom upon bodily tilting.

79. In a mine or similar rail car, the combination of a substantially rectangular traction truck frame, car axles including journals, car wheels located outside the frame, axle boxings located between the wheels, a lading body supported by said frame and including portions extending laterally past the wheels, and a wheel hood-covering extending over one said wheel and extending downward below the horizontal plane of the tops of the axle journals.

80. In an end-dump mine or similar rail car, the combination of car axles including journals, car wheels, a bumper at the forward end of the car, a secured stationary lading bottom floor-structure including one part below the level of said bumper and another part rising obliquely for discharge of the lading over the bumper when the car is tilted forward for dumping, said floor-structure also including parts extending in hood-form over said wheels and slanting rearward from the wheels to serve as deflectors for the longitudinal discharge of the lading past the wheels when the car is tilted forward for dumping.

81. In an end-dump mine or similar rail car, the combination of car wheels, car axles, a front end bumper, a lading bottom structure including deflectors rising to the height of the tops of the car wheels, other deflectors rising to the tops of the car axles, and still other deflector means rising to the height of the top of the bumper whereby the lading of the car may discharge by gravity out of the front end of the car when it is tilted forward for end-dumping.

82. In an end-dump mine or similar rail car, the combination of car wheels, car axles, a front end bumper, deflectors rising to the height of the top of the car wheels, and other deflectors rising to the height of the top of the bumper whereby the lading of the car may discharge by gravity out of the front end of the car when it is tilted forward for end-dumping.

83. In an end-dump mine or similar rail car, the combination with a secured stationary sub-axle lading bottom and a traction truck including car wheels, car axles, and a front end bumper, of deflectors rising to the height of the tops of the car wheels, other deflectors rising to the tops of the car axles, and still other deflector means rising to the height of the top of the bumper whereby the lading of the car may discharge by gravity out of the front end of the car when it is tilted forward for end-dumping.

84. In an end-dump mine or similar rail car, the combination with a secured stationary sub-axle lading bottom and a traction truck frame including car wheels, car axles, and a front end bumper, of deflectors rising to the height of the tops of the car wheels, other deflectors rising to the height of the top of the bumper whereby the lading of the car may discharge by gravity out of the front end of the car when it is tilted forward for end-dumping.

85. In a mine or similar rail car, the combination of side sill-members, car axles having journals whose centers are located in a horizontal plane above the lower portions of the side sill-members, a lading holding body including lading wings, said lading wings including lading wing bottom portions inclined longitudinally of the car, and a secured stationary lading bottom located at least in substantial part below the horizontal plane of the tops of the journals of the car axles.

86. In a mine or similar rail car, the combination of car axles, load-supporting side members intersecting the horizontal plane of the centers of the journals of the car axles, end bumper structures, a lading holding body including lading wings, said lading wings including lading wing bottom portions below the horizontal plane of the tops of the car wheels, and a secured metal stationary lading bottom located at least in substantial part below the horizontal plane of the tops of the axle journals and also below the plane of the tops of the end bumper structures.

87. In a car of the kind described, the combination with straight side sill-members, of transverse end structures, end structure stiffening means located between the side sill-members, axles having journals whose centers lie in a horizontal plane cutting the side sill-members and the end structures, car wheels between the side sill-members, and a lading bottom having at least substantial portions below the horizontal plane of the tops of the axle journals and including hoods extending over the wheels.

88. In mine and similar rail cars, the combination of straight longitudinal load-supporting side members, car axles for supporting the side members and having journals, wheels for supporting the car axles, and end sill structure including a metal sill member with an upright wall and a horizontal flange and a bumper and coupling means, a central lading bottom located at least in substantial part below the plane of the tops of the car axle journals and also below the horizontal plane of the upper portions of the side members, and a side lading wing bottom extending outwardly through the vertical plane of the inside of the flanges of the adjacent car wheels and located at a lesser angle to the horizontal than the angle of the repose of loose coal and similar lading.

89. In mine and similar rail cars, the combination of longitudinal and substantially straight load-supporting side members with substantially upright walls, car axles for supporting the side members and having journals, wheels for supporting the car axles, an end sill structure including a bumper member, a central lading bottom located at least in substantial part below the plane of the tops of the car axle journals and also below the horizontal plane of the upper portions of the upright walls of the side members, and a side lading wing bottom having portions extending outward through the vertical longitudinal plane of the inside of the flanges of the car wheels on the same side of the car at a level below the tops of said wheels.

90. In mine and similar rail cars, the combination of side sills with lower sections having upright walls, car axles supporting the side sills and having journals, wheels supporting the car axles, an end traction transverse structure including a transverse metal member with a stiffening flange, a bumper member, a central lading bottom located at least in substantial part below the plane of the tops of the car axle journals and also below the horizontal plane of the upper portions of the upright walls of the side sills, a side lading wing bottom extending through the vertical longitudinal plane of the inside of the flanges on the same side of the car and having portions located in a plane inclined to the horizontal at a lesser angle than the angle of repose of loose coal and similar lading, and a part of each of said wheels on said side projecting through the plane of the said lading wing bottom between the ends of said wing bottom.

91. In mine and similar rail cars, the combination of longitudinal load carrying side sill-members rigidly connected with traction end structures which include wood cushioning members and metal bumper members, car axles penetrating and supporting the side sill-members, car wheels outside the sill-members, a lading holding body including lading wings extending outward from the sill-members in planes cutting the adjacent wheels together with a central lading bottom located at least in substantial part below the plane of the centers of the car axle journals.

92. In end-dumping mine and similar rail cars, the combination of longitudinal metal load-supporting side sill-members with substantially upright sections, the said members serving at least in part as lading body closure walls, car axles for supporting the said side sill-members and having journals located in a horizontal plane cutting the said upright sections, an end traction structure rigid in respect of the said side sill-members and including a metal bumper member, a securely fastened lading bottom at least in substantial part located between the upright planes of the upright sections of the side sill-members and having at least portions located below the horizontal plane of the tops of the axle journals and also below the horizontal plane of the upper portions of the end traction structures, lading wing bottom portions located in planes cutting the adjacent wheels, and wheel deflector means whereby the lading is carried over the tops of the wheels when the car is tilted for end-dumping.

93. In end-dumping mine and similar rail cars, the combination of longitudinal metal load-supporting side sill-members with substantially upright sections having sidewise extending stiffening sections, the said sill-members serving at least in part as lading body closure walls, car axle journals whose centers lie in a horizontal plane cutting the upright sections of the longitudinal side sill-members, wheels on the axle journals, a rigidly related traction end structure including a bumper member, a stationary secured central lading bottom located at least in substantial part between the upright longitudinal planes of the side members and having at least substantial portions below the plane of the tops of the axle journals, and an end structure deflector means sloped to carry the lading from the said portions of the central lading bottom over the top of the end traction structure when the car is tilted for end dumping, and a lading wing bottom wall having a plane portion extending laterally outward through the vertical longitudinal plane of the inside of the flanges of the car wheels on the same side of the car with the plane of the said bottom wall cutting the wheels on said side.

94. In mine and similar rail cars, the combination of car axles having journals, longitudinal side load-supporting metal members with substantially upright lower sections and sidewise extending stiffening sections, the said longitudinal members at least in part serving as lading body closure walls, said axle journals having their centers located in a horizontal plane cutting the said lower sections of the longitudinal metal members, wheels for supporting the axles, a securely fastened central lading bottom located intermediate the upright longitudinal planes of the longitudinal metal members and having at least substantial portions located below the horizontal plane of the tops of the axle journals and also below the horizontal plane of the upper portions of the longitudinal members, an axle deflector means rising from the said central lading bottom at a low angle approximately to the horizontal plane of the top of a car axle whereby the lading is deflected over the axle when the car is tilted for end-dumping, a lading body wing extending through the vertical longitudinal plane of the inside of the flanges of the car wheels on the same side of the car, and the plane of the bottom of the said wing cutting the wheels on said side.

95. In a mine or similar rail car, the combination of wheels and axles having journals, an end sill structure having bumper and coupling means, a car lading body including a secured metal plate located in a plane cutting the wheels and forming a central lading bottom located between two oppositely disposed wheels and wing lading bottoms extending laterally outward, at least substantial portions of the said bottoms being located below the plane of the tops of the axle journals, and independent metal supports for the said wing lading bottoms located wholly at the corresponding side of the car.

96. In a mine or similar rail car, the combination of wheels, side sill-members having substantially upright lower walls, axles having journal centers located in a horizontal plane cutting the said upright walls, a secured metal plate supported by said side sill-members and having a central portion forming a substantially continuous and rectangular sub-axle central lading bottom, said metal plate also extending laterally and substantially continuously beyond said side sill-members to form lading wings.

97. In a mine or similar rail car, the combination of load-supporting longitudinal side members with substantially upright lower wall sections, low-lying bumper means at an end of the car, car axles penetrating and supporting the side members, a central lading bottom of rectangular perimeter and having its lower portions located in a horizontal plane below the horizontal plane of the tops of the car axle journals and cutting the side members, a side lading wing bottom extending laterally outward substantially from the longitudinal upright plane of the lower wall section of one of the side members in a plane cutting the car wheels on the same side of the car, a vertical longitudinal lading retaining side wall at the outside of the said lading wing bottom, and a lading body end closure wall secured to the said outside vertical wall.

98. In a mine or similar rail car, the combination of wheels, end structures including bumper and coupling means, side sill-members with upright lower wall-sections, axles having journal centers located in a horizontal plane cutting the said lower wall-sections, a stationary and substantially rectangular central lading bottom located between the side sill-members and having lower portions located in a horizontal plane below the horizontal plane of the tops of the car axle journals and cutting the said lower wall-sections of the side sill-members, side lading wing bottoms each extending laterally outward substantially from the upper portions of the said upright lower wall-sections and through the longitudinal vertical planes of the wheel gauge line on the same side of the car and in planes cutting the wheels on the same side of the car, upright longitudinal lading retaining closure walls at the outside of the said lading wing bottoms, and a lading body end closure wall in secured relationship with the said outside vertical walls.

99. In a mine or similar rail car, the combination of car wheels and axles, side beams, a substantially horizontal and secured central sub-axle lading bottom of substantially rectangular perimeter, wing bottoms at each side of the car extending beyond the adjacent car wheel flanges and intersecting the upright plane of the inside of said wheel flanges, upwardly extending covers over the said wheels, and independent stiffening means for supporting said wing bottoms extending outwardly from the said side beams and located wholly at the corresponding side of the car.

100. In a mine or similar rail car, the combination of car wheels and axles, at least one axle having two wheels thereon, end bumper structures, a substantially horizontal secured central lading bottom of substantially rectangular perimeter and extending from one end bumper structure to the other and located between the two car wheels on said one axle, a wing lading bottom extending substantially from the horizontal plane of the top surface of the central lading bottom laterally outward through the upright plane of the inside of the flange of the car wheel on the same side of the car in a plane cutting the said wheel, an upwardly extending section covering the said wheel, and outwardly extending stiffening means located wholly on the corresponding side of the car for supporting said wing bottom.

101. In an end-dump mine or similar rail car, the combination of car wheels and axles, a lading body including side closure walls, a substantially horizontal secured central lading bottom located between the two car wheels on one axle and extending from one end of the lading body to the other, a wing lading bottom extending substantially from one lateral edge of the central lading bottom laterally outward through the upright plane of the inside of the flanges of the car wheels on the same side of the car in a plane cutting the said wheels, deflector-form and upwardly extending coverings over the said wheels, stiffening means extending laterally outward from the said central lading bottom for supporting said wing bottom, and a movable end for the lading body, whereby the lading may pass over the tops of the wheels and be discharged when the car is tilted for end dumping toward said end.

102. In a mine or similar rail car, the combination of car wheels and axles, end structures including metal bumpers and coupling means, a lading body including a substantially horizontal central secured sub-axle lading bottom of rectangular perimeter extending from end to end of the lading body and located between the longitudinal upright planes of the inside of the flanges of laterally oppositely disposed wheels, wing bottoms extending from substantially the edges of the central lading bottom laterally outward through the said upright planes of the inside of the flanges of the car wheels on the same side of the car in planes intersecting the said wheels, upwardly extending coverings over the said wheels of wide lateral dimensions whereby the wheels may be readily removed from the axles, and laterally outward extending stiffening members for supporting the wing bottoms.

103. In a mine or similar rail car, the combination of a rigid end structure including bumper and coupling means, car wheels and axles, a stationary sub-axle lading bottom structure having portions each extending laterally outward beyond the upright longitudinal planes of two oppositely disposed wheels in planes cutting the car wheels on the same side of the car as said portion, and deep hood-forms extending over the wheels and providing a principal supporting means for the laterally extended portions of the lading bottom structure.

104. In a mine or similar rail car, the combination of a rigid end structure including bumper and coupling means, wheels and axles, a lading body including a central stationary sub-axle lading bottom of rectangular perimeter which extends from end to end of the lading body, wing lading bottoms constituting extensions of the central lading bottom and themselves extending laterally outward in planes cutting the adjacent car wheels, hood-form extensions of the said wing bottoms extending over the said wheels and being so wide that the wheels may be readily removed from the axles, and stiffening members extending laterally outward from the said central lading bottom underneath the said wing bottoms for supporting the wing bottoms.

105. In a mine or similar rail car which is to be bodily shifted to dumping position for emptying, the combination of car wheels and axles having journals, upright longitudinal side closure walls located laterally outside the wheels and having their lower edges located below the horizontal plane of the tops of said journals, a rigid end structure including bumper and coupling means, and a lading bottom extending from one of said upright side walls to the other and having the lading surface of a major portion thereof located below said plane, said closure walls and bottom providing a substantially unobstructed lading space from which the lading may be discharged by bodily shifting the car to emptying position.

106. In a mine or similar rail car which is to be bodily shifted to dumping position for emptying, the combination of car wheels and axles having journals, upright longitudinal side closure walls located laterally outside the wheels and having their lower edges located below the horizontal plane of the tops of said journals, a rigid end structure including bumper and coupling means, a substantially continuous lading bottom of substantially rectangular perimeter extending from one of said upright side walls to the other and having the lading surface of a major portion thereof located below said plane, said closure walls and bottom providing a substantially unobstructed lading space from which the lading may be discharged by bodily shifting the car to emptying position.

107. In a mine or similar rail car which is to be bodily shifted to dumping position for emptying, the combination of car wheels and axles having journals, upright longitudinal side closure walls located laterally outside the wheels and having their lower edges located below the horizontal plane of the tops of said journals, a substantially continuous lading bottom extending from one of said upright side walls to the other and joined to the said walls adjacent their lower edges, said bottom having deep hood-form extensions extending over said wheels and connected to and supporting said lading bottom adjacent said side walls, said closure walls and bottom providing a substantially unobstructed lading space from which the lading may be discharged by bodily shifting the car to emptying position.

108. In a mine or similar rail car, the combination of car wheels and axles, a lading body including a secured stationary sub-axle central lading bottom, longitudinal load-supporting side members, an end traction structure in rigid relationship with the side members and including a flanged metal cross member having an upright wall and including also two metal bumper members providing laterally spaced upright bumping faces separated by a recess and a coupler attachment member in said recess, the said metal bumper members having flanges directed towards the lading body and having wood filler members.

109. In a mine or similar rail car, the combination of car wheels, side sill-members with upright wall sections, car axles having journal centers located in a horizontal plane cutting the upright wall sections of the side sill-members, a central lading bottom having a lower portion located in a horizontal plane below the horizontal plane of the tops of the axle journals and below the horizontal plane of the upper portions of the upright wall sections of the side sill-members, wing bottoms including portions sloping longitudinally upwardly over the tops of the car wheels, a composite end traction structure including a metal cross member which is attached to the side sill-members, and metal corner bracing and attaching members located in part in horizontal planes and secured to the said metal cross member and also to the said side sill-members whereby the said side sill-members and the end structure are strengthened against warping and twisting with reference to one another.

110. In a mine or similar rail car, the combination of car wheels and axles including journals, a traction truck frame with substantially straight longitudinal side members extending above and below the horizontal plane of the centers of the journals of the axles, a sub-axle lading bottom, and a composite end traction structure forming one end of the traction truck frame and including a metal cross member, and metal bracing members located in part in a horizontal plane and corner members connecting the cross member and side members whereby the said end structure and the said side members are strengthened against warping and twisting with reference to one another.

111. In a mine or similar rail car, the combination of a lading body having side sills having substantially upright sections, car axles having journals with their centers located in a horizontal plane cutting the upright sections of the side sills, an end traction structure including a flanged metal end member formed to present a substantially continuous upright back face and having a flange directed longitudinally outwardly away from the lading body, and a drawbar coupler-attachment tongue having a small transverse dimension and connected with said upright back face and extended longitudinally outwardly across the upper part of the flanged end member and apertured for receiving a coupling pin.

112. In a mine or similar rail car, the combination of longitudinal load-supporting side members with substantially upright sections, axles having journals with their centers located in a horizontal plane cutting the upright sections of the side members, a stationary secured lad'ng bottom having portions located in a horizontal plane below the horizontal plane of the tops of the axle journals and also below the plane of the top of the upright sections of the side members, an end traction structure supported by the side members and including a transverse metal member with an upright back face, and a metal coupler-attachment means connected with said back face and extending longitudinally outwardly therefrom.

113. In a mine or similar rail car having a lading body, the combination of car wheels and axles, metal side sills with substantially upright lower sections, axles having journals with their centers located in a horizontal plane cutting the said upright sections, an end traction structure including a transverse metal member having an upright web which is in secured relationship with the side sills and also having a lower horizontal flange directed away from the lading body, the said end structures also including a metal member having an upright section overlapping said upright web and secured thereto and having a horizontal flange directed away from the lading body of the car, and a drawbar member overlapping the face of said upright web and secured to said web and extending upwardly and then longitudinally outwardly in a horizontal plane away from the said lading body and apertured for receiving a coupling pin.

114. In a mine or similar rail car, the combination of longitudinal load-supporting side members with substantially upright lower sections, car wheels, car axles having journal centers located in a horizontal plane cutting the said upright sections, wheels for supporting the axles, end sill traction structures including bumper means and coupling means, a central lading bottom extending longitudinally between end structures and of substantially rectangular perimeter and with a portion thereof located in a horizontal plane below the horizontal plane of the tops of the axle journals and cutting the upright sections of the side members, a side lading wing bottom portion extending laterally outward substantially from the vertical face of the said upright sections of one of the said side members and extending through the upright plane of the inside of the flanges of the car wheels at the same side of the car and located in a plane cutting the said wheels, and a deep hood-covering over at least one car wheel on such side of the car.

115. In an end-dump mine or similar rail car having a movable front end gate closure wall, the combination of straight longitudinal load-supporting side sills with substantially upright walls, wheels, axles with journals whose centers are located in a horizontal plane cutting the upright walls of the side sills, end traction structures in rigid relationship with the side sills, a central stationary lading bottom, side lading wing-bottoms extending substantially from the plane of the upright walls of the corresponding side sill in a plane cutting the wheels at the same side of the car, and wheel hood-coverings of deflector shape whereby the lading is adapted to pass the wheel hood-coverings for discharge at the end gate when the car is tilted forward for end dumping.

116. In a mine or similar rail car, the combination of wheels and longitudinal metal side sill-members with substantially upright lower walls stiffened by sidewise extensions, car wheels, car axles with their journal centers located in a horizontal plane cutting the upright lower walls of the sill-members, end traction structures rigidly related to the sill-members so as to form a strong traction truck frame, a central stationary secured metal lading bottom, side lading wing bottoms each extending substantially from the plane of the upright wall of the corresponding side sill-member in planes cutting the wheels at the same side of the car, and deep wheel hood-coverings.

117. In a mine or similar rail car, the combination of car wheels, longitudinal load-supporting side members with substantially upright lower walls, car axle journals with their centers located in a horizontal plane that cuts the upright lower walls of the side members, wheels on the axle journals, end traction structures rigid with the side members, a central stationary secured lading bottom having at least a substantial part located below the horizontal plane of the tops of the axle journals and also below the horizontal plane of the said upper portions of the upright walls of the side sills, side lading wing bottoms each extending substantially from the top of the upright wall of the corresponding side sill in a plane cutting the wheels at the same side of the car, the side lading wing bottoms being apertured between their ends to receive the tops of the said wheels, and wheel hood-coverings for closing the apertures.

118. In a mine or similar rail car, the combination of car axles, car wheels, side sills intersecting the horizontal plane of the centers of the journals of the car axles, a plate metal lading bottom having its lowest portions located in a horizontal plane substantially at the level of the horizontal plane of the lowest portions of the side sills, and other portions of the lading bottom extending laterally beyond said side sills to form lading wings, and metal wheel hood-coverings each having longitudinal closure walls at both outer and inner ends.

119. In a mine or similar rail car, the combination of longitudinal load-supporting side members with substantially upright lower walls, car axles for supporting the side members, car wheels inside the lower walls of the side members, a central lading bottom having its lowest portions located in a horizontal plane substantially at the level of the horizontal plane of the lowest portions of the side members, lading wings having plane bottom portions extending laterally from the central lading bottom through the longitudinal vertical wheel gauge planes of the adjacent car wheels, with the planes of the said bottom portions cutting the said adjacent car wheels, and hood-coverings over the wheels.

120. In an end dump mine or similar rail car, longitudinal side members, wheel axles for supporting said side members and having journals with their tops above the horizontal plane of the bottoms of said side members, a stationary metal bottom structure having parts rigidly connected to the lower portions of said side members and located below the axle journals, and other parts which extend at least to the height of the tops of the axles for guiding the lading over the axles for end dumping.

121. In a mine or similar rail car, longitudinal side members, wheel axles with journal centers located in a horizontal plane cutting said side members, a stationary metal bottom structure rigidly secured to the side members and having parts which are lower than the axles, and other parts which are above the axles, and cross members supported by and bracing the side members.

122. In a mine or similar rail car which is to be bodily shifted to dumping position for emptying, car axles having journals, wheels, a central lading bottom between two wheels on one axle, side lading bottom wings at each side extending laterally outward through the upright longitudinal plane of the inside of the flanges of the wheels on the same side of the car and having portions of their lower surfaces located below the horizontal plane of the centers of the journals of the car axles, and continuous upward extending side walls at the lateral edges of the wings, said bottom, wings and side walls providing a substantially unobstructed space from which the lading may be discharged by shifting the car to emptying position.

123. In a mine or similar rail car which is to be bodily shifted to dumping position for emptying, car axles supporting the car lading body and having journals, wheels supporting the axles, a central lading bottom located between two wheels on one axle and having portions located below the horizontal plane of the tops of the journals of the car axles, side lading bottoms at each side extending laterally outward through the upright longitudinal plane of the inside of the flanges of the wheels at the same side of the car and having portions of their lower surfaces located below the horizontal plane of the tops of the journals of the car axles, and continuous upward extending side walls at the lateral edges of the wings, said bottom, wings and side walls providing a substantially unobstructed space from which the lading may be discharged by shifting the car to emptying position.

124. In a mine or similar rail car, the combination of car axles for supporting the car lading body and having journals, wheels for supporting the axles, and a lading body including straight longitudinal side load-carrying members serving at least in part as lading body closure walls and a central lading bottom located between two wheels on one axle with portions of said lading floor located below the horizontal plane of the tops of the journals of the car axles, a side lading bottom extending laterally outward through the upright plane of the inside of the flanges of the adjacent wheels and having portions of its lower surface located below the horizontal plane of the tops of the journals of the car axles.

125. In a mine or similar rail car, the combination of a supporting and substantially rectangular traction truck frame with stiff load-supporting side sill-members and with transverse end members rigid in respect of the side members, car axles whose journals lie in a horizontal plane cutting the side sill-members, wheels supporting the axles and located outside the side sill-members, a lading body including a lading bottom between the side sill-members, side lading bottoms extending laterally outward from the side sill-members and located in planes cutting the adjacent car wheels and at least in part below the horizontal plane of the tops of the axle journals, substantially upright longitudinal closure sides laterally outside the adjacent car wheels, and bracing and supporting means located close to said wheels for connecting the side sill-members of the traction truck frame with the said adjacent closure sides.

126. In a mine or similar rail car, the combination of lading body-supporting longitudinal side members, car axles having journals, wheels supporting the axles, a lading bottom having portions laterally outside the wheels and located in a horizontal plane below the horizontal plane of the tops of the journals of the car axles, the lading bottom having wheel apertures, stiff side and top coverings for the said apertures and constituting truss-members whereby the portions of the lading bottoms laterally outside the wheels are at least in part supported against drooping.

127. In a mine or similar rail car having a lading body, the combination of lading body supporting longitudinal sill-members, axles having journals, wheels supporting the axles, a substantially rectangular lading bottom having portions which are laterally outside the wheel flanges and also having portions located below the horizontal plane of the tops of the journals of the car axles, the lading bottoms having wheel apertures, wheel hood-coverings for the apertures having bottom portions located in a horizontal plane below the plane of the tops of the journals of the car axles and side wall portions serving as bracing and supporting members to the lading body, and end structures including bumper and coupling means.

128. In a mine or similar rail car, the combination of longitudinal side members having substantially upright lower walls located between the wheels, an end structure with drawbar attachments, car axles having journals with their centers located in a horizontal plane cutting the said upright walls of the side members, a securely fastened and supported car bottom located between two wheels on one axle with at least substantial portions of the lower surfaces of the said car bottom located below the horizontal plane of the tops of the journals of the car axles, wing lading bottoms each having portions extending laterally outward through the upright plane of the inside of the flanges of the adjacent car wheels and located in planes cutting the said adjacent wheels, and an end structure including a bumper element with a metal bumping face, the lower portions of the said bumping face being located below the horizontal plane of the tops of the journals of the car axles.

129. In a mine or similar rail car, the combination of flanged wheels, axles having journals, bumping and traction means, metal longitudinal side load-supporting means at least in part serving as lading-body side closure walls, a lading bottom having wing portions laterally outside the wheel flanges and having portions located below the plane of the tops of the axle journals, and the said wheels projecting through apertures in the side portions of the lading bottom, and wheel hood-coverings connected to the wing portions and extending transversely and outwardly over the apertures for covering the wheel flanges and serving at least in part as supporting means for the wing portions of the lading bottom.

130. In a mine or similar rail car, the combination of car wheels, car axles having journals, longitudial load-supporting means extending above and below the horizontal plane of the centers of the journals of the car axles, a lading body with side and end closure-walls, and a lading bottom having portions of its lower surface below the horizontal plane of the tops of the axle journals, the said lading body being apertured between its ends for the tops of the car wheels, wheel-coverings with longitudinally extending wall parts, the said wheel-coverings extending laterally outward beyond the treads of the car wheels and having their outer ends rigidly secured to the lading-body side closure walls whereby they serve as bracing and supporting means for the said side walls.

131. In a mine or similar rail car, the combination of wheels, car axles having journals, a lading body having side and end closure-walls and having apertures between its outer ends for the tops of the wheels, a lading bottom having portions of its lower surface below the horizontal plane of the tops of the journals of the axles, deep wheel-coverings extending laterally outward beyond the treads of the wheels and having their outer ends rigidly secured to the lading-body side closure-walls whereby they serve as bracing means for the said side walls and as load-supporting means for said bottom, transverse bracing means extending from one wheel covering to another, longitudinal load-supporting means extending above and below the horizontal plane of the centers of the journals of the axles, and end members.

132. In a mine or similar rail car, the combination of wheels, car axles having journals, a lading-body having side and end closure-walls having apertures between their ends, a secured metal lading bottom having portions of its lower surface below the plane of the tops of the axle journals, deep wheel-coverings extending laterally outward beyond the treads of the wheels and having their outer ends in rigid relationship with the lading-body side closure-walls whereby they serve as bracing means for the said side walls and as a load-supporting means for said bottom, and the said wheel-coverings having openings at their outer ends alined with said apertures whereby the wheels may readily be removed from the axle, and straight stiff longitudinal means for supporting the lading in the ends of the car, and extending from end to end of the lading body.

133. In an end-dump mine or similar rail car, the combination of wheels, car axles having journals, a lading body including a stationary lading bottom with a central portion and with wing portions laterally outside the adjacent wheel flanges, parts of the lading bottom being located below the plane of the tops of the axle journals, longitudinal lading-body load-supporting metal means located laterally outside the said central portion of the lading bottom, said wheels projecting into apertures of the wing portions of the lading bottom, and coverings closing the apertures and extending over the tops of the said wheels and so sloped that the lading of the car can pass over them when the car is tilted for end dumping.

134. In a mine or similar rail car, the combination of car axle journals, a lading body including a secured metal lading bottom having at least substantial portions below the horizontal plane of the tops of the car axle, journals, car wheels projecting into the lading body of the car, and a traction end sill structure including bumper and coupling means, the said end sill structure extending above and below the horizontal plane of the centers of the car axle journals.

135. In a mine or similar rail car, the combination of car axle journals, car wheels, a lading body including a lading bottom having at least substantial portions below the horizontal plane of the tops of the car axle journals, car wheels projecting into the lading body of the car, hood coverings each extending over two wheels on the same side of the car, and a traction end sill structure including bumper and coupling means, the said sill structure extending above and below the horizontal plane of the centers of the car axle journals.

136. In a mine or similar rail car, the combination of car axle journals, car wheels, a central lading body, side lading wing body portions having lading bottoms each located in a horizontal plane cutting the car wheels on the same side of the car and apertured to receive the car wheels, straight longitudinal load-supporting sills located outside the car wheels and extending above and below the horizontal plane of the centers of the car axle journals, and hood-coverings over the car wheels.

137. In a mine or similar rail car, the combination of car axle journals, a lading body including a lading bottom having at least substantial portions below the horizontal plane of the tops of the car axle journals, car wheels projecting into the lading body of the car, straight longitudinal load-supporting side sills located outside the car wheels and extending above and below the horizontal plane of the centers of the car axle journals and extending from end to end of the car body, and hood-coverings over the car wheels.

138. In a mine or similar rail car which is to be bodily shifted to dumping position for emptying, the combination of car wheels, car axle journals, a lading body including a lading bottom having portions of its lower surface both outside and inside the track gauge lines located below the horizontal plane of the tops of the car axle journals, an end sill structure including bumper and haulage means, and side walls included in said lading body and forming with said bottom a substantially unobstructed lading space from which the lading may be discharged by bodily shifting the car to emptying position.

139. In a mine or similar rail car which is to be bodily shifted to dumping position for emptying, the combination of car wheels, car axles having journals, a lading body including means for stiffening it against end-drooping and a lading bottom of substantially rectangular perimeter having at least substantial portions below the horizontal plane of the tops of the car axle journals, deep wheel hood-coverings having substantially upright inside longitudinal walls that serve as part of side closure-walls of the lading body, and whose tops serve as part of the lading bottom, and other members providing side walls sealed with said lading bottom, said bottom and hood-coverings and side walls providing a substantially unobstructed lading space from which the lading may be discharged by bodily shifting the car to emptying position.

140. In a mine or similar rail car which is to be bodily shifted to dumping position for emptying, the combination of car wheels, car axles having journals, a lading body including means for stiffening it against end-drooping and a lading bottom of substantially rectangular perimeter, and having at least substantial portions below the horizontal plane of the tops of the car axle journals, deep separate wheel hood-coverings over each wheel having substantially upright inside longitudinal walls that serve as part of side closure walls of the lading body, and each of the said walls being located just inside the flange of its adjacent wheel, and the tops of the hood-coverings serving as parts of the lading bottom, and longitudinal upright members joining the hood-coverings for providing side closure walls of the lading body, said body, hood-coverings and longitudinal members providing a substantially unobstructed lading space from which the lading may be discharged by bodily shifting the car to emptying position.

141. In a mine or similar rail car which is to be bodily shifted to dumping position for emptying, the combination of car wheels, car axles having journals, a lading body including means for stiffening it against end-drooping and a lading bottom having at least substantial portions below the horizontal plane of the tops of the car axle journals, and deep wheel hood-coverings with substantially upright inside longitudinal walls that serve as part of side closure walls of the lading body and that extend from above the tops of the wheels to a point below the horizontal plane of the tops of the car axle journals, an end structure containing bumper and coupling means, and other members providing side walls sealed with said lading bottom, said bottom and hood-coverings and side walls providing a substantially unobstructed lading space from which the lading may be discharged by bodily shifting the car to emptying position.

142. In a mine or similar rail car, the combination of car wheels, car axles having journals, a lading body including means for stiffening it against end-drooping and a lading bottom having at least substantial portions below the horizontal plane of the tops of the car axle journals, and deep wheel hood-coverings having substantially upright inside longitudinal walls that serve as part of side closure walls of the lading body, and that extend downward to a point below the horizontal plane of the tops of the axle journals and substantially to the lowest horizontal levels of the lading bottom, and end traction sill structures including bumper and coupling means, and upright longitudinal members connected to said bottom and the lateral outside portions of the hood-coverings for providing side walls in the lading body.

143. In mine or similar rail cars, the combination of car wheels, car axles having journals, deep hoods over the wheels extending below the horizontal plane of the tops of the car axle journals, continuous side walls connecting the lateral outside portions of the wheel hoods and transverse tie and stiffening means for bracing oppositely disposed hoods and side walls.

144. In mine or similar rail cars, the combination of car wheels, car axles having journals, a lading bottom located at least in substantial part below the horizontal plane of the tops of the car axle journals, deep wheel hoods with substantially upright inside longitudinal walls, continuous side walls connecting the lateral outside portions of the wheel hoods and transverse tie and stiffening means for bracing oppositely disposed wheel hoods and side walls.

145. In a mine or similar rail car which is to be bodily shifted to dumping position for emptying, the combination of car axles, car wheels, car axle journals, a lading body structure including means for stiffening it against end-drooping, continuous lading body longitudinal side walls, and a lading bottom with at least substantial portions located below the horizontal plane of the tops of the car axle journals, and means associating the car axles and the lading body attached to the lading body structure and located laterally outside the wheels, said side walls and bottom providing a substantially unobstructed lading body space from which the lading may be discharged by bodily shifting the car to emptying position.

146. In a mine or similar rail car, the combination of car axles having journals, car wheels, a lading body structure including means for stiffening it against end-drooping, continuous lading body longitudinal side walls, and a lading bottom sealed to said side walls and with at least substantial portions located below the horizontal plane of the tops of the car axle journals, and stiffening means covering the car axles and car wheels and extending transversely from lading body side wall to side wall and secured to and bracing the said side walls.

147. In a mine or similar rail car, the combination of car wheels, car axles having journals, a lading body structure including a lading bottom located at least in part below the horizontal plane of the tops of the journals of the car axles and also including means for stiffening the body against end drooping, axle boxings guided directly by said stiffening means, and a shock absorbing means between the axles and the lading body structure.

148. In mine or similar rail cars which is to be bodily shifted to dumping position for emptying, the combination of car wheels, car axles having journals, a lading bottom located at least in part below the horizontal plane of the tops of the car axle journals, deep wheel-hoods over the wheels and having substantially upright longitudinal walls both outside and inside the wheels, other members providing substantially continuous upright side walls spaced from the longitudinal hood walls, and an end structure including bumper and coupling means, said bottom, hoods and side walls providing a substantially unobstructed lading space from which the lading may be discharged by bodily shifting the car to emptying position.

149. In a mine or similar rail car, the combination of car wheels, axle supports between two opposed wheels, a traction truck frame on said axle supports, car axles having journals with their centers located in a horizontal plane intersecting the sides of the traction truck frame, a lading body including means for stiffening the same against end drooping, and wheel hood coverings having substantially upright longitudinal walls between opposed wheels, said walls forming a part of the lading body side closure-walls and extending below the horizontal plane of the tops of the car axle journals.

150. In a mine or similar rail car, the combination of wheels, axle supports between two opposed wheels, longitudinal load-supporting side sills, car axles having journals with the horizontal plane of the tops of the journals intersecting said side sills, and a car lading body having transverse upright cross-sections which are substantially rectangular and including a sub-axle lading bottom at least a part of which extends between and is secured to said sills below said plane.

151. In a mine or similar rail car, the combination of wheels, axle supports located outside the wheels, longitudinal load-supporting side sills, car axles having journals with the horizontal plane of the tops of the journals intersecting said side sills, and a car lading body having transverse upright cross sections which are substantially rectangular and including a sub-axle lading bottom.

152. In a mine or similar rail car, the combination of longitudinal load-supporting side sills, car axles having journals with the horizontal plane of the tops of the journals intersecting the side sills, and a car lading body having transverse upright cross sections that are substantially rectangular and including a sub-axle bottom and side wall members fixedly sealed with respect to one another.

153. In a mine or similar rail car, the combination of car wheels, axle supports between two opposed wheels, longitudinal load-supporting side sills, car axles having journals with the horizontal plane of the tops of the journals intersecting the side sills, and a car lading body having transverse upright cross sections that are substantially rectangular, the lading body being located at least in part below the upper parts of the car wheels and recessed for receiving the car wheels.

154. In a mine or similar rail car, the combination of car wheels, axle supports outside the car wheels, longitudinal load-supporting side sills, car axles having journals with the horizontal plane of the tops of the journals intersecting the side sills, and a car lading body having transverse upright cross sections that are substantially rectangular, the lading body being located at least in part below the upper parts of the car wheels and recessed for receiving the car wheels.

155. In a mine or similar rail car, the combination of car wheels and axles having journals, longitudinal load-supporting side sills, the horizontal plane of the tops of said journals intersecting said side sills, and a car lading body having transverse upright cross sections that are substantially rectangular and including a sub-axle lading bottom, said sub-axle lading bottom being recessed to receive the upper parts of the wheels.

156. In a mine or similar rail car, the combination of a lading body including metal lading-retaining side closure-walls having substantially straight and upright longitudinal lower wall-sections which are stiffened by sidewise projections and which serve as lading body load-supporting means, car axle journals whose centers lie in a horizontal plane cutting the said side closure walls, said body also including a lading bottom having lower surfaces located below the horizontal plane of the tops of the axle journals, car wheels located between said side closure walls projecting into the lading body space of the car, and hood-coverings over the car wheels and extending above the said lading bottom.

157. In a mine or similar rail car, the combination of car axles having journals, a lading body including a sheet metal lading floor having lower surfaces located below the horizontal plane of the tops of the journals of the car axles, a substantially rectangular and rigid traction truck frame for supporting the lading body in substantially unyielding fashion, car wheels penetrating the lading body, rigidly secured metal transverse hoods for covering said wheels, said body also including sheet metal closure side walls and end walls connected rigidly and forming a stiff and approximately rectangular box section at the uppermost horizontal cross section of the lading body, means associated with the side members of the traction truck frame whereby the car axles support the frame, and one of said means permitting a limited downward movement of the corresponding end of a car axle whereby the chance of derailment of the car on an uneven track is lessened.

158. In an end traction structure for a traction truck frame of a mine or similar rail car having axles, journals and side sills and a lading body, a transverse metal member extending from side sill to side sill and having a horizontal flange directed longitudinally outwardly away from the lading body of the car below the axle journal plane, a bumper structure including an external metal bumper facing extending substantially from side sill to side sill and also including a bumper cushioning member between said facing and transverse member, and means for holding said facing and cushioning member in position on said transverse member.

159. In an end traction structure for the traction truck frame of a mine or similar rail car having a lading body, car wheels and axles having journals, a transverse metal member having horizontal flanges directed longitudinally away from the lading body of the car, at least one flange being below the horizontal plane of the axles, a metal bumper in interfitting engagement with the said flanges, a filler element between the bumper element and said transverse member, and means for holding said member and elements in position.

160. In a traction truck frame for a mine or similar rail car having side sills, an end traction structure including a first metal member, a second metal member, and a third metal member, said first metal member having an upright web-section extending transversely and adapted to be secured to said side sills and having a lower horizontal flange directed longitudinally away from the lading body of the car, said second member having an upright flange located against the outer face of the web of the said first member and secured to said web and having a lower horizontal flange spaced from the flange of the first member to provide space for a web filler, said third member overlapping the inner face of the web of the first member and secured thereto and extending upward and across said web and horizontally outward, and spaced from the flange of the second member and apertured to receive a coupling pin.

161. In a traction truck frame for a mine or similar rail car having side sills, the combination of an end traction structure adapted to be connected with the side sills and including a flanged metal cross member having an upright wall and including two laterally spaced metal bumper members each with upright bumping faces separated by an opening adapted for a coupler attachment member, the said metal bumper members having flanges directed towards the lading body of the car, wood filler members for said bumpers, and a secured coupler attachment member located between the two said bumping faces.

162. In a mine or similar rail car, a traction truck frame including side sills and end sills connected together, wheels and axles located with axes intersecting said side sill-members, a sub-axle lading bottom member connected to the lower portions of said side sills and bracing the same, and metal corner brace members located at least in part in horizontal planes and overlapping said side sills and end sills and secured thereto whereby the said side sills and end sills are strengthened against warping and twisting with respect to one another.

163. In a traction truck frame for a mine or similar rail car having side sills, the combination of an end traction structure including a metal cross member having attached corner members which are adapted to be attached to longitudinal upright surfaces of the side sills, and metal corner bracing members located in part in horizontal planes and attached to horizontal surfaces of the cross member.

164. In a traction truck frame for a mine or similar rail car having side sills, the combination of an end traction structure connected to said sills and including a metal end member with a substantially continuous upright back face and having a longitudinally outwardly extended flange, and a draw-bar coupling attachment tongue having a small transverse dimension connected to said frame inside said upright back face and extended outwardly across the upper part of the flanged end member and apertured for receiving a coupling pin.

165. In a traction truck frame for a mine or similar rail car having side sills, an end traction structure including a transverse metal member having an upright web which is adapted to be secured to the side sills and having also a lower horizontal outwardly directed flange, and said end structure also including a metal member having an upright flange overlapping the said upright web and secured thereto and having a horizontal flange extending outwardly at least as far as the said lower flange, and a draw-bar extending inside of and overlapping and secured to said web and extending upward and then horizontally outwardly in the longitudinal direction of the car.

166. In a mine or similar rail car, a traction truck frame, car axles having journals, a sub-axle lading bottom with its ends located substantially in a plane adjacent the lower portions of the truck frame, one end having perforations along its edge, said frame including an end traction structure having a transverse metal member with a lower flange which is perforated, and means extending through said perforations for fastening the lading bottom to the flange at a low level.

167. In a mine or similar rail car having car wheels and axles with axle journals, a lading body with an end wall and a plate metal lading bottom located at least for a major portion below the horizontal plane of the axle journals, and an end traction structure comprising in part an extension of the lading bottom beyond the junction of the end wall and bottom and in part a transverse metal structure secured to said extension and having a portion apertured to receive a coupling pin, and a draw-bar member secured to said bottom and including an apertured portion spaced from said first apertured portion to receive a coupling pin.

168. In a mine or similar rail car having car wheels and axles with axle journals, a lading body with an end wall and a plate metal lading bottom located at least for a major portion below the horizontal plane of the axle journals, and an end traction structure comprising in part an extension of the lading bottom beyond the junction of the end wall and bottom, a draw-bar member having a part spaced from said extension and apertured to receive a coupling pin, said end structure also including a portion with a coupling pin aperture, and means in the space between the said apertured portions for engaging a coupling link.

169. In mine and similar rail cars, a traction truck frame comprising side members and end members, a lading bottom secured to the side members substantially at their lower edges and including a portion extending upward at an end of the car and beyond the corresponding end member and apertured for receiving a coupling pin, said end member including a draw-bar member spaced from said extension whereby to receive a coupling link and being apertured in alinement with the aperture in said extension to receive the coupling pin.

170. In an end traction structure for a mine or similar rail car having a plate metal lading bottom with a longitudinal extension at the end, a plate metal member secured to said extension at points spaced from the transverse edge thereof, said member including one portion extending at an acute angle to the extension and another portion substantially parallel to but spaced from said extension, and a filling member located between said extension and plate metal member.

171. In a mine or similar rail car, the combination of a lading body structure including side and end closure walls, two stiff longitudinal load-supporting side sill-members, car axles having journals with the horizontal plane of the centers of the journals intersecting the side sill-members, said structure also including a lading bottom securely fastened to the sill-members and having portions of its bottom surface located below the horizontal plane of the centers of the axle journals, car wheels whose tops penetrate the lading body, stiff secured hood coverings over the car wheels, means connecting the side closure walls rigidly with at least one of the end closure walls, rigid connections between the lading body structure and the two side sill-members whereby the said sill-members and the lading body structure form a rigid and substantially unyielding super-structure, and means whereby the axles support the super-structure and permitting vertical movements of one end of a car axle in relation to the super-structure whereby the chance of derailment of the car on an uneven track is lessened.

172. In a mine or similar rail car, the combination of a lading body structure including side and end closure walls, two stiff longitudinal load-supporting side sill-members, car axles having journals with the horizontal plane of the centers of the journals intersecting the side sill-members, said structure also including a lading bottom securely fastened to the sill-members and having portions of its bottom surface located below the horizontal plane of the centers of the axle journals, car wheels whose tops penetrate the lading body, stiff secured hood coverings over the car wheels, rigid connections between the lading body structure and the two side sill-members whereby the said sill-members and the lading body structure form a rigid and substantially unyielding super-structure, means whereby the axles support the super-structure and permitting vertical movements of one end of a car axle in relation to the super-structure whereby the chance of derailment of the car on an uneven track is lessened.

173. In mine and other cars, the combination of car wheels and axles, side sills supported thereby, end sills fixed thereto with the bottom faces of the side and end sills approximately in a common horizontal plane, and a lading floor fixed to said sills and having its major level arranged approximately in said common plane and below the horizontal plane in which the car axles are located and including at least one metal floor portion extending from side sill to side sill and secured thereto and bracing the same.

174. In a mine or similar rail car, the combination of car wheels, car axles having journals, side beams, axle boxings guided from said side beams and movable with respect thereto, the horizontal plane of the axle journals intersecting the side beams, a lading body located at least in part below the horizontal plane of the tops of the axle journals, and shock absorbing means interposed between the axle boxings and said side beams and bottom.

175. In a mine or similar rail car, the combination of car wheels, car axles having journals, side beams, axle boxings guided from said side beams and movable with respect thereto, the horizontal plane of the axle journals intersecting the side beams, a lading body located at least in part below the horizontal plane of the tops of the axle journals, shock absorbing means interposed between the axle boxings and said side beams and bottom, a cross tie member connected to said boxings and extending from one boxing to another in spaced relationship to the axle, and shock absorbing means interposed between the cross tie and said beams and bottom.

176. In a mine or similar rail car, the combination of car wheels, car axles having journals, a lading body structure including a lading bottom located at least in part below the horizontal plane of the tops of the axle journals and also including upright side members, axle guiding structures for controlling the axles during upward and downward movements of the individual wheels with respect to the body and pivoted to said upright side members, and means for limiting the pivotal movement of said elements.

177. In a mine or similar rail car, the combination of side beams, car axles having journals, said journals being located wholly above the lower portions of the side beams, a composite end structure including a channel member, and a stationary sub-axle lading bottom including a substantially horizontal portion extending between and rigidly attached to the said lower portions of the side beams and rigidly attached to the said channel member for bracing said side beams and end structure with relation to one another.

178. In a mine or similar rail car, the combination of side beams, car axles having journals, said journals being located wholly above the lower portions of the side beams, an end beam of approximately channel shape connected to said side beams above the lower portions thereof, and a stationary sub-axle lading bottom including a substantially horizontal portion extending between and attached to said side beams at the said lower portions thereof and attached rigidly to the end beam for bracing said side and end beams with relation to one another.

179. In a mine or similar rail car, the combination of side beams having lower portions extending uninterruptedly past the axles, car axles located above the lower portions of the side beams, and a lading holding body including wing floors and a stationary sub-axle lading bottom between the side beams and attached rigidly to said lower portions thereof for bracing the same.

180. In a car of the kind described, the combination of wheels, car axles, body side members having uninterrupted lower portions, end closures, bumper means, coupling members, axle journals located entirely above said lower portions of the side members, the wheels and axles being grouped between transverse upright planes which intersect low parts of the lading floor, and a substantially horizontal plate metal sub-axle lading floor closing the space between the side members and end closures and rigidly attached to at least one end closure and to the said lower portion of at least one said side member for preventing relative horizontal movements of said end closure and side member.

AUDLEY H. STOW.